(12) United States Patent
Hattori et al.

(10) Patent No.: US 8,318,061 B2
(45) Date of Patent: Nov. 27, 2012

(54) MOLD TEMPERATURE CONTROL CIRCUIT OF INJECTION MOLDING DEVICE AND METHOD FOR DISCHARGING HEATING MEDIUM

(75) Inventors: Michitaka Hattori, Nagoya (JP); Satoshi Imaeda, Nagoya (JP); Toshihiko Kariya, Nagoya (JP)

(73) Assignee: Mitsubishi Heavy Industries Plastic Technology Co., Ltd., Nagoya-shi, Aichi (JP)

( * ) Notice: Subject to any disclaimer, the term of this patent is extended or adjusted under 35 U.S.C. 154(b) by 0 days.

(21) Appl. No.: 13/001,912

(22) PCT Filed: Jun. 29, 2009

(86) PCT No.: PCT/JP2009/061870
§ 371 (c)(1),
(2), (4) Date: Dec. 29, 2010

(87) PCT Pub. No.: WO2010/052951
PCT Pub. Date: May 14, 2010

(65) Prior Publication Data
US 2011/0115120 A1 May 19, 2011

(30) Foreign Application Priority Data
Nov. 6, 2008 (JP) ................... 2008-285685

(51) Int. Cl.
*B29C 45/73* (2006.01)
(52) U.S. Cl. .................. 264/40.6; 264/328.16; 425/143; 425/547
(58) Field of Classification Search ................. 264/40.6, 264/328.16; 425/143, 144, 547
See application file for complete search history.

(56) References Cited

U.S. PATENT DOCUMENTS
7,527,756 B2 * 5/2009 Miyagawa et al. .......... 264/40.6
(Continued)

FOREIGN PATENT DOCUMENTS
CN 101157267 A 4/2008
(Continued)

OTHER PUBLICATIONS
Taiwanese Office Action dated Apr. 1, 2011, issued in corresponding Taiwanese Patent Application No. 098121686.
(Continued)

*Primary Examiner* — Jill Heitbrink
(74) *Attorney, Agent, or Firm* — Westerman, Hattori, Daniels & Adrian, LLP

(57) ABSTRACT

In a mold temperature control circuit of an injection molding device, such a molding cycle is repeated that, prior to injection of a resin, a heating-use medium is returned to molds and heated to a temperature suitable for resin injection, after injection of the resin, the heating-use medium is switched to a cooling-use medium, thereby the cooling-use medium is returned to the molds and cooling is conducted to give a temperature equal to or lower than a temperature at which the resin is solidified. In the mold temperature control circuit of the injection molding device, a junction piping is able to commonly use the respective supply pipings of the heating-use medium, the cooling-use medium and the scavenging compressed air to the molds and the respective discharge pipings thereof, and there is provided mold bypass piping coupling the supply-side junction piping of the heating medium with the discharge-side junction piping, a mold bypass on-off valve, a passed heating medium sensor, a mold-temperature adjusting control device which stores a mold temperature determination program and a passed heating medium determination program.

23 Claims, 11 Drawing Sheets

U.S. PATENT DOCUMENTS

| | | | |
|---|---|---|---|
| 2003/0085491 A1 | 5/2003 | Saeki et al. | |
| 2005/0276880 A1 | 12/2005 | Saeki et al. | |
| 2007/0184139 A1* | 8/2007 | Muranaka et al. | 425/143 |
| 2008/0111280 A1* | 5/2008 | Choe et al. | 264/328.16 |
| 2009/0053347 A1 | 2/2009 | Shimodo et al. | |

FOREIGN PATENT DOCUMENTS

| | | | |
|---|---|---|---|
| CN | 101181818 A | 5/2008 | |
| JP | 62-179912 A | 8/1987 | |
| JP | 01-259907 A | 10/1989 | |
| JP | 5-006490 B2 | 1/1993 | |
| JP | 2957139 B2 | 10/1999 | |
| JP | 2000-233411 A | 8/2000 | |
| JP | 2001-009839 A | 1/2001 | |
| JP | 2003-145542 A | 5/2003 | |
| JP | 2005-205876 A | 8/2005 | |
| JP | 2007-083502 A | 4/2007 | |
| JP | 2009-196088 A | 9/2009 | |
| JP | 2010-018020 A | 1/2010 | |
| JP | 2010-111022 A | 5/2010 | |
| TW | 466166 B | 12/2001 | |
| TW | 2007-22263 A | 8/2007 | |

OTHER PUBLICATIONS

International Search Report of PCT/JP2009/061870, mailing date Oct. 6, 2009.
Written Opinion of PCT/JP2009/061870, mailing date Oct. 6, 2009.
Taiwanese Office Action dated Sep. 27, 2011, issued in corresponding Taiwanese Patent Application No. 098121686.
International Search Report dated Jun. 1, 2010, issued in the corresponding PCT/JP2010/002879.
Written Opinion dated Jun. 1, 2010, issued in the corresponding PCT/JP2010/002879.

* cited by examiner

MOLD TEMPERATURE CONTROL CIRCUIT OF INJECTION MOLDING DEVICE AND METHOD FOR DISCHARGING HEATING MEDIUM

TECHNICAL FIELD

The present invention relates to temperature control of a mold capable of switching a heating medium which is used in an injection molding machine, etc., to conduct heating or cooling, and in particular to a mold temperature control circuit capable of treating a heating medium remaining in heating medium supply piping to reduce time lost in switching from heating to cooling or vice versa and a method for discharging a heating medium.

Priority is claimed on Japanese Patent Application No. 2008-285685, filed Nov. 6, 2008, the content of which is incorporated herein by reference.

BACKGROUND ART

A conventional mold disclosed in Patent Document 1 is provided with temperature sensors arranged at individual parts of a mold, a switch valve unit which supplies a heating-use medium to be supplied from a heating unit, a cooling-use medium to be supplied from a cooling unit and scavenging compressed air by switching them and continues to a collectable heating medium path, and a control unit which is installed on the switch valve unit having a timer and a temperature determination program, in which the temperature determination program is used to determine a temperature detected by the temperature sensor and the timer is activated to control the supply of the heating-use medium, the cooling-use medium and the scavenging compressed air to the mold and molding motions of a molding machine by using the time preset by the timer.

PRIOR ART DOCUMENT

Patent Document

[Patent Document 1] Japanese Published Unexamined Patent Application, Publication No. 2007-83502 (FIG. 1)

SUMMARY OF THE INVENTION

Problems to be Solved by the Invention

When heating is switched to cooling or vice versa in heating and cooling a mold to effect molding, immediately before the switch, the heating medium remaining in the mold and heating medium supply piping is required to be discharged from heating medium discharge piping to the outside. In this case, even if a supply source of a heating medium is switched to another, the mold is actually not increased or decreased in temperature until a period during which the heating medium remaining inside heating medium supply piping between the supply source and the mold as well as the heating medium remaining in a heating medium circuit inside the mold are discharged through the heating medium circuit inside the mold and thereafter the next heating medium arrives at the mold. Therefore, the period becomes wasted time. Further, since many fine pipings involved in mold heating and cooling the mold thereinside are large in flow resistance, it takes time to discharge a heating medium and also high pressure is required to discharge the heating medium. Therefore, work of switching a heating medium only through the heating medium circuit inside the mold is lower in energy efficiency.

A mixer is installed in order to appropriately mix steam, which is a heating-use medium, with water, which is a cooling-use medium, thereby preventing a phreatic explosion, noise or vibration, decreasing the temperature of steam which flows into a heating medium return circuit, and condensing steam into water. In a mixer large in inflow resistance of the heating medium, when all heating media flowing from a mold are allowed to pass, it takes time to discharge heating media from the mold, and high pressure is also required to discharge the heating media, thus resulting in lower energy efficiency. Further, in a mixer smaller in inflow resistance of the heating medium, steam pressure inside the mold is decreased on heating to result in lower heating efficiency. It is thus necessary to install a throttle on steam inflow piping of the mixer. As a result, inflow resistance is increased.

An object of the present invention is to provide a mold temperature control circuit of an injection molding device which is simple in structure and accelerates the discharge of a heating medium remaining inside heating medium supply piping between a supply source of a heating medium and a mold and that remaining in a heating medium circuit inside the mold, thereby shortening the time for switching a heating medium to cut down a molding cycle, and reducing the extent that a heating-use heating medium discharged from the mold is mixed with a cooling-use heating medium, thus making it possible to enhance energy efficiency of heat exchange and also to provide a method for discharging a heating medium. It is noted that the term "scavenging compressed air" used in the present invention means "compressed air for discharging a heating-use medium and a cooling-use medium from the inside of piping and a mold" and the term "heating medium" means "a heating-use medium, or a cooling-use medium, or scavenging compressed air." Further, the term "and/or" means one of two things or both of them.

Means for Solving the Problems (1) The mold temperature control circuit of a first aspect is a mold temperature control circuit of an injection molding device which is provided with a fixed mold and/or a movable mold, a supply-side manifold connecting the molds with supply pipings of a heating-use medium, a cooling-use medium and scavenging compressed air, a discharge-side manifold connecting the molds with discharge pipings of the heating-use medium, the cooling-use medium and the scavenging compressed air, a plurality of heating/cooling common-use fine pipings which are housed inside the molds and joined to the manifolds, and a mold temperature sensor installed on the molds, in which in an injection step of closing the molds to effect clamping and thereafter injecting a resin, such a molding cycle is repeated that prior to injection of the resin, the heating-use medium is returned to the molds and heated to a temperature suitable for resin injection, after injection of the resin, the heating-use medium is switched to the cooling-use medium, thereby the cooling-use medium is returned to the molds to conduct cooling so as to give a temperature equal to or lower than a temperature at which the resin is solidified.

There are provided an on-off valve of the supply piping of the heating-use medium, an on-off valve of the supply piping of the cooling-use medium, an on-off valve of the supply piping of the scavenging compressed air for discharging the heating-use medium and the cooling-use medium from the pipings and the molds, and a junction piping of combining the respective supply pipings of the heating-use medium, the cooling-use medium and the scavenging compressed air into one. Thereby, the junction piping is able to commonly use the respective supply pipings of the heating-use medium, the cooling-use medium and the scavenging compressed air to the molds and the respective discharge pipings thereof.

In this case, the mold temperature control circuit of the first aspect is characterized by having a mold bypass piping for coupling the supply-side junction piping of a heating medium with the discharge-side junction piping thereof, a mold bypass on-off valve installed on the mold bypass piping, a passed heating medium sensor installed on the heating medium supply piping and/or the discharge piping to detect passage of the heating-use medium, the cooling-use medium and the scavenging compressed air, and a mold-temperature adjusting control device which stores a mold temperature determination program for comparatively determining a target mold temperature preset as a control program and a mold temperature detected by the mold temperature sensor as well as a passed heating medium determination program for determining a type of passed heating medium by using completion of the time preset by a timer for adjusting opening/closing timing of the mold bypass on-off valve and/or a signal detected by the passed heating medium sensor, thereby adjusting the opening/closing timing of the mold bypass on-off valve or characterized by having the passed heating medium sensor which is located closer to the molds than a connecting position to the mold bypass piping in the discharge piping of the heating medium near the molds in addition to the supply piping, thereby detecting passage of the heating-use medium, the cooling-use medium and the scavenging compressed air.

(2) The mold temperature control circuit of a second aspect is the mold temperature control circuit of the above-described (1), in which the mold bypass piping and the mold bypass on-off valve are installed on the fixed mold and/or the movable mold.

(3) The mold temperature control circuit of a third aspect is the mold temperature control circuit of the above-described (1), in which a pair of mold bypass circuits including the mold bypass piping and the mold bypass on-off valve are coupled with supply ports and discharge ports of both the fixed mold and the movable mold in the vicinity of the fixed mold and/or the movable mold, and the fixed mold and the movable mold commonly use the mold bypass circuit.

(4) The mold temperature control circuit of a fourth aspect is the mold temperature control circuit of the above-described (1) to (3), in which the passed heating medium sensor is a pressure sensor or a temperature sensor.

(5) The mold temperature control circuit of a fifth aspect is a mold temperature control circuit of an injection molding device which is provided with the fixed mold and/or the movable mold, a supply-side manifold for connecting the molds with supply pipings of a heating-use medium, a cooling-use medium and scavenging compressed air, a discharge-side manifold for connecting the molds with discharge pipings of the heating-use medium, the cooling-use medium and the scavenging compressed air, a plurality of heating/cooling common-use fine pipings which are housed inside the molds and joined to the manifolds, and a mold temperature sensor installed on the molds, in which in an injection step of closing the molds to effect clamping and thereafter injecting a resin, such a molding cycle is repeated that, prior to injection of the resin, the heating-use medium is returned to the molds and heated to a temperature suitable for resin injection, after injection of the resin, the heating-use medium is switched to the cooling-use medium, thereby the cooling-use medium is returned to the molds to conduct cooling so as to give a temperature equal to or lower than a temperature at which the resin is solidified.

This mold temperature control circuit is characterized in that on the downstream side of discharge pipings of the molds, there are installed a mixer for mixing the heating-use medium discharged from the molds with the cooling-use medium for cooling the heating-use medium, a discharge piping on-off valve which is located in the vicinity of the mixer to open and close a flow path communicatively connecting the discharge piping of the molds with the mixer, discharge piping on-off valve bypass piping which circumvents the discharge piping on-off valve to communicatively connect the mixer, and a variable throttle valve which is located on the discharge piping on-off valve bypass piping and capable of adjusting the flow rate of the heating-use medium.

(6) The method for discharging a heating medium in a previous step in the sixth aspect is a method for discharging a heating medium in a previous step by using the mold temperature control circuit described in any one of the above-described (1) to (4) and characterized in that simultaneously with a halt of supplying the heating medium in the previous step, a heating medium switching delay timer is started, completion of the time preset by the heating medium switching delay timer or a heating-medium supply starting signal in a later step according to progress of an injection step is used to start to supply the heating medium in the later step, conduct a motion of opening the mold bypass circuit and start a mold bypass circuit closing delay timer, and upon completion of the time preset by the mold bypass circuit closing delay timer or at the time point when a passed heating medium sensor installed on a mold supply-side piping portion detects the heating medium in the next step, the mold bypass circuit is closed. It is noted that the term "progress of an injection step" used in the present invention means the progress not only in injection/filling steps but also the progress in steps of cooling and solidifying a resin inside a mold cavity.

(7) The method for discharging a heating medium in the previous step in a seventh aspect is the method for discharging a heating medium in the previous step in the above-described (6) which is characterized in that the supply of the heating medium in the previous step is halted upon completion of the time preset by a timer which starts from the beginning of supplying the heating medium in the previous step and/or at the time point when a mold temperature has reached a predetermined temperature.

(8) The method for discharging a heating medium in a previous step in an eighth aspect is the method for discharging a heating medium in the previous step as described in the above (6) or (7) which is characterized in that the heating medium in the previous step is a heating-use medium and the heating medium in a later step is a cooling-use medium.

(9) The method for discharging a heating medium in the previous step in a ninth aspect is the method for discharging a heating medium in the previous step as described in the above (6) or (7) which is characterized in that the heating medium in a previous step is a cooling-use medium and the heating medium in a later step is a heating-use medium.

(10) The method for controlling a mold temperature control circuit in a tenth aspect is characterized in that in the mold temperature control circuit described in any one of the above-described (1) to (4), simultaneously with a halt of supplying a heating-use medium, a heating medium switching delay timer is started, completion of the time preset by the heating medium switching delay timer or a heating-medium switch starting signal according to progress of an injection step is used to start the supply of scavenging compressed air, conduct a motion of opening the mold bypass circuit and start a mold bypass circuit closing delay timer, upon completion of the time preset by the mold bypass circuit closing delay timer or at the time point when the passed heating medium sensor installed on the mold supply-side piping portion detects scavenging compressed air, the mold bypass circuit is closed, a scavenging compressed air supply halt delay timer is started at the same time, and upon completion of the time preset by the scavenging compressed air supply halt delay timer or at the time point when the passed heating medium sensor installed on the mold discharge-side piping portion detects scavenging compressed air, the supply of scavenging compressed air is halted.

(11) The method for controlling a mold temperature control circuit in an eleventh aspect is characterized in that in the mold temperature control circuit described in any one of the above-described (1) to (4), simultaneously with a halt of supplying a heating-use medium, a heating medium switching delay timer is started, completion of the time preset by the heating medium switching delay timer or a heating-medium switch starting signal according to progress of an injection step is used to start the supply of scavenging compressed air, conduct a motion of opening the mold bypass circuit and start a scavenging compressed air supply halt delay timer, upon completion of the time preset by the scavenging compressed air supply halt delay timer or at the time point when the passed heating medium sensor installed on the mold supply-side piping portion detects scavenging compressed air, the supply of scavenging compressed air is halted to start a cooling motion start delay timer, completion of the time preset by the cooling motion start delay timer or a cooling start signal according to progress of an injection step is used to start the supply of a cooling-use medium and also start the mold bypass circuit closing delay timer, and upon completion of the time preset by the mold bypass circuit closing delay timer or at the time point when the passed heating medium sensor installed on the mold supply-side piping portion detects the cooling-use medium, the mold bypass circuit is closed.

(12) The method for discharging a heating medium in a previous step described in a twelfth aspect is the method for discharging a heating-use medium described in the above (10) or (11), in which the supply of a heating-use medium is halted upon completion of the time preset by a timer which starts from the beginning of supplying the heating-use medium and/or at the time point when a mold temperature has reached a predetermined temperature.

(13) The method for controlling a mold temperature control circuit in a thirteenth aspect is characterized in that in the mold temperature control circuit described in any one of the above (1) to (4), simultaneously with a halt of supplying a cooling-use medium, a heating medium switching delay timer is started, completion of the time preset by the heating medium switching delay timer or a heating-medium switch starting signal according to progress of an injection step is used to start the supply of scavenging compressed air and conduct a motion of opening the mold bypass circuit, upon completion of the time preset by a predetermined timer or at the time point when the passed heating medium sensor installed on the mold supply-side piping portion detects scavenging compressed air, the mold bypass circuit is closed, and upon completion of the time preset by the predetermined timer or at the time point when the passed heating medium sensor installed on the mold discharge-side piping portion detects scavenging compressed air, the supply of scavenging compressed air is halted.

(14) The method for controlling a mold temperature control circuit in a fourteenth aspect is characterized in that in the mold temperature control circuit described in any one of the above (1) to (4), simultaneously with completion of a cooling step, a heating medium switching delay timer is started, completion of the time preset by the heating medium switching delay timer or a heating-medium switch starting signal according to progress of an injection step is used to start the supply of scavenging compressed air, and conduct a motion of opening the mold bypass circuit, upon completion of the time preset by a predetermined timer or at the time point when the passed heating medium sensor installed on the mold supply-side piping portion detects scavenging compressed air, the supply of scavenging compressed air is halted and also a heating motion start/delay timer is started, completion of the time preset by the heating motion start/delay timer or a heating start signal according to progress of the injection step is used to start a heating motion, and upon completion of the time preset by the predetermined timer or at the time point when the passed heating medium sensor installed on the mold supply-side piping portion detects a heating-use medium, the mold bypass circuit is closed.

(15) The method for discharging a heating medium in a previous step in a fifteenth aspect is the method for discharging a cooling-use medium described in the above (13) or (14) which is characterized in that the supply of the cooling-use medium is halted upon completion of the time preset by a timer which starts from the beginning of supplying the cooling-use medium and/or at the time point when a mold temperature has reached a predetermined temperature.

(16) The method for controlling a mold temperature control circuit in a sixteenth aspect is a method for discharging a heating-use medium from a mold in the mold temperature control circuit described in the above (5), in which during a heating step, of the first half of heating, the discharge piping on-off valve is opened, installed on piping between the heating medium discharge piping continuing from the molds and the mixer, of the second half of heating, the discharge piping on-off valve is closed, a variable throttle valve installed on the discharge piping on-off valve bypass piping which bypasses the drain piping on-off valve is used to adjust the flow rate and pressure of the heating-use medium, thereby the heating-use medium on completion of heating is made higher in pressure than the heating-use medium of the first half of heating.

(17) The method for controlling a mold temperature control circuit in a seventeenth aspect is a method for discharging a heating-use medium from the molds in the mold temperature control circuit described in the above (5), in which, while a heating medium which enters from the discharge piping of a heating medium continuing from the molds into the mixer is high in temperature, the discharge piping on-off valve installed on piping between the discharge piping and the mixer is opened, and also the heating medium discharge valve which connects the discharge piping continuing from the molds with return piping to external cooling equipment is closed to introduce the heating medium into the mixer, while the heating medium which enters from the discharge piping into the mixer is not high in temperature, the heating medium discharge valve which connects the discharge piping continuing from the molds with the return piping to the external cooling equipment is opened, thereby the heating medium discharged from the molds through the discharge piping is discharged to the external cooling equipment.

(18) The method for treating a heating-use medium in an eighteenth aspect is a method for discharging a heating medium which uses any one of the above-described sixth aspect to the fifteenth aspect, and the method is characterized by being conducted in the above sixteenth aspect and/or the seventeenth aspect.

Effects of the Invention

The above-described first aspect to the fifth aspect involve a mold temperature control circuit, and the above-described sixth aspect to the eighteenth aspect involve a method for discharging a heating medium using the mold temperature control circuit. On switching the heating medium for heating or cooling the molds, a signal detected by a passed heating medium sensor is used to determine the type of passed heating medium, or the signal of a timer in anticipation of arrival time of the heating medium in the next step to the mold is used to discharge the heating medium in a previous step remaining inside the supply piping to the discharge piping by way of bypass piping without passing through the inside of the molds large in flow resistance and, thereafter, the heating medium in a next step is supplied to the molds, thus making it possible to shorten the switching time of the heating medium.

In fact, in the inventions related to the above-described first aspect to the eighteenth aspect, where heat exchange is attempted to be conducted in the molds evenly and as quickly as possible in producing a molded article thin and large in area, individual fine pipings are 2 to 100 times higher in flow resistance than the bypass piping. Further, in a large-sized heating medium supply/discharge circuit which is longer in distance from a heating medium supply source to the molds and greater in capacity inside the piping than in volume of flow paths inside the molds, it is particularly effective in simultaneously shortening the switching time of a heating medium and reducing thermal energy loss.

In particular, arrangement of the bypass piping in the above-described second aspect is arranged by installing a mold bypass circuit on the fixed mold and/or the movable mold. Therefore, the mold bypass circuit can be arranged irrespective of the relative distance between the fixed mold and the movable mold, thereby eliminating the necessity for taking a piping movement region into account. This is effective in the case where the movable mold is required to move over a longer distance on mold opening. Further, arrangement of the bypass piping in the above-described third aspect is able to downsize the mold bypass circuit and reduce the length of the piping thereof to a greater extent than in the above-described second aspect in the case where the movable mold moves over a shorter distance on mold opening, thus making it possible to reduce the cost. Both the mold bypass pipings in the second and the third aspects can be easily attached to an existing mold.

The invention related to the above-described fourth aspect is able to select an easy and appropriate way for detecting a heating medium from another, even where there is used a heating medium different in state characteristics such as gas or liquid in terms of change in pressure or temperature, depending on whether the heating medium is a heating-use medium or a cooling-use medium.

In the inventions related to the above-described fifth aspect and the sixteenth aspect, in the first half of the heating step, the heating-use medium is supplied to the molds in a large flow rate in a state lower in flow resistance on discharge, while in the second half of the heating step, prior to a step of discharging the heating-use medium, the pressure inside the molds at the time of completing the heating step is kept high, thereby the heating-use medium inside the molds at the time of starting heating can be made greater in outflow velocity. Therefore, it is possible to shorten the time of discharging the heating-use medium inside the molds. Further, at the time of completing the heating, the pressure of the heating-use medium inside the molds is a static pressure and can be increased evenly, thereby preventing variation in pressure of the heating-use medium in association with loss of flow pressure occurring inside the molds in a heating medium flow path which is narrow and complicated in shape. Therefore, the flow pressure is difficult to transmit in the heating medium flow path inside the molds, irrespective of the shape thereof, and at the time of starting discharge of the heating-use medium, static pressure is given even to a part where the heating medium is difficult to press out. Further, since pressure is sufficiently available for discharging the heating-use medium, it is possible to suppress retention of the heating-use medium and also enhance the efficiency of discharging the heating-use medium. Still further, the piping may be kept high in pressure thereinside only during the second half of the heating step, which is shorter in time and therefore effective in saving energy.

The heating-use medium inside the molds is kept high in pressure during the second half of the heating step and, as a result, the heating-use medium can be kept high in temperature as well. Therefore, it is possible to effectively shorten the heating time and enhance the energy efficiency of heat exchange even in a state that the heating-use medium is similar in temperature to the molds to result in a lower increase in the temperature elevating speed. Further, the first half of the heating step is switched to the second half of the heating step at the time point when the mold temperature has reached a preset switching temperature or upon completion of the time preset by a timer, for example, a timer which starts from the beginning of heating, by which the pressure of the heating-use medium inside the molds can be reproduced at a higher possibility and controlled stably.

In the inventions related to the above-described fifth aspect and the seventeenth aspect, a heating medium discharged from the molds to the heating medium discharge piping of a temperature controller is introduced into the mixer to mix the heating medium with a cooling-use medium supplied from external cooling equipment in order to lower a temperature of the heating medium when the heating medium is high in temperature. And the heating medium is directly discharged into cooling-water return piping connected to the external cooling equipment when the heating medium discharged into the heating medium discharge piping is not high in temperature. Thereby, the heating medium can be discharged without passing through the mixer which is greater in flow resistance and longer in discharging time when the heating medium is not high in temperature. It is thus possible to shorten the time necessary for discharging the heating medium and realize high energy efficiency.

The inventions related to the above-described sixth aspect to the eighth aspect involve a method for discharging a heating medium in the previous step in which after the supply of a heating medium in the previous step is halted, simultaneously with start of supplying the heating medium in the next step, a mold bypass on-off valve installed on the mold bypass piping for coupling the supply-side supply piping of the heating medium with the discharge-side junction piping thereof is opened to purge the heating medium in the previous step remaining inside the supply-side junction piping from a supply source of the heating medium to the mold bypass on-off valve through the mold bypass piping into the discharge-side junction piping, thereafter, the heating medium in a next step is supplied, and at the time point when the heating medium in the next step arrives in the vicinity of the molds, the mold bypass on-off valve is closed to feed the heating medium in the next step into the molds.

According to the method for discharging a heating medium in a previous step, it is possible to prevent a mold temperature from overshooting or undershooting a target temperature because the heating medium in a previous step remaining inside the supply-side junction piping of the heating medium is pushed by a cooling-use medium in a next step on switching the step, flowing into the mold, thereby giving such a state that is as close as continuation of the previous step. Further, the heating medium can be discharged without passing through many fine pipings involved in mold heating and cooling inside the molds large in flow resistance, thus making it possible to shorten the time necessary for the heating medium to arrive from a supply source of the heating medium to the molds and, also smoothly adjust the mold temperature at higher accuracy.

The inventions related to the above-described tenth aspect and the twelfth aspect involve a method for discharging a heating-use medium in which at a timing when the mold temperature controller is switched from one step to another, the supply of a heating-use medium in the previous step is discontinued, thereafter, the mold bypass on-off valve installed on the mold bypass piping which couples the heating medium supply piping with the heating medium discharge piping is opened and at the same time the on-off valve of scavenging compressed air is opened, thereby the heating medium in the previous step remaining inside the supply-side junction piping of the heating medium is purged by scavenging compressed air by way of the mold bypass piping into the discharge-side junction piping, thereafter, with the supply of scavenging compressed air kept, the mold bypass on-off valve is closed to feed scavenging compressed air into the molds, and at the time point when the heating-use medium remaining in the heating medium circuit inside the molds is discharged into drain piping, the supply of scavenging compressed air is halted.

According to the method for discharging a heating-use medium, it is possible to prevent the mold temperature from exceeding a target heating completion temperature and being excessively heated because the heating-use medium remaining inside the supply-side junction piping of the heating medium is pushed by the heating medium in the next step on switching the step, flowing into the molds, thereby giving such a state that is as close as continuation of the heating step. And, not only can the heating medium be discharged without passing through many fine pipings involved in mold heating and cooling inside the molds large in flow resistance but also air smaller in flow pressure loss than liquid can be used to scavenge the heating medium in the previous step. Therefore, it is possible to shorten the time necessary for discharging the heating-use medium inside the heating medium circuit and the supply piping in the molds. Further, after the mold bypass on-off valve is closed, the scavenging compressed air is forcibly supplied to the flow path inside the molds. Thereby, it is possible to reliably discharge the heating-use medium inside the molds before the heating medium in the next step is supplied.

The inventions related to the above-described eleventh aspect and the twelfth aspect involve a method for discharging a heating-use medium in which at the timing when the mold temperature controller is switched from one step to another, the supply of a heating-use medium in the previous step is discontinued, thereafter, the mold bypass on-off valve installed on the mold bypass piping which couples the heating medium supply piping with the heating medium discharge piping is opened, and at the same time the on-off valve of scavenging compressed air is opened, thereby the heating medium in the previous step remaining inside the supply-side junction piping of the heating medium is purged by scavenging compressed air by way of the mold bypass piping into the discharge-side junction piping, thereafter, the supply of scavenging compressed air is halted, the mold bypass on-off valve is kept opened to also start the supply of a cooling-use medium in the next step, and at the time point when the cooling-use medium arrives in the vicinity of the molds, the mold bypass on-off valve is closed to feed the cooling-use medium into the molds.

According to the method for discharging a heating-use medium, it is possible to prevent the mold temperature from exceeding a target heating completion temperature and being excessively heated because the heating-use medium remaining inside the supply-side junction piping of the heating medium is pushed by the heating medium in the next step on switching the step, flowing into the molds, thereby giving such a state that is as close as continuation of the heating step. And, not only can the heating medium but also the scavenging compressed air inside the supply piping from a supply source of the scavenging compressed air to the mold bypass on-off valve be discharged without passing through many fine pipings involved in mold heating and cooling inside the molds greater in flow resistance. It is thus possible to shorten the time necessary for the cooling-use medium to arrive at the molds from the supply source of the cooling-use medium and also promptly adjust the mold temperature.

The inventions related to the above-described thirteenth aspect and the fifteenth aspect involve a method for discharging a cooling-use medium in which the supply of the cooling-use medium in the previous step is halted, thereafter, the mold bypass on-off valve is opened which is installed on the mold bypass piping to couple the heating medium supply piping with the discharge piping thereof and at the same time the supply of scavenging compressed air is started, thereby, the cooling-use medium remaining inside the supply-side junction piping of the cooling-use medium is purged by scavenging compressed air by way of the mold bypass piping into the discharge-side junction piping, thereafter, with the supply of scavenging compressed air kept, the mold bypass on-off valve is closed to feed scavenging compressed air into the molds, and at the time point when the cooling-use medium remaining in the heating medium circuit inside the molds is discharged into the drain piping, the supply of scavenging compressed air is halted.

According to the above-described method for discharging a cooling-use medium, it is possible to prevent the mold temperature from being lower than a target cooling completion temperature and excessively cooled because the cooling-use medium remaining inside the supply-side junction piping of the heating medium is pushed by the heating medium in the next step on switching the step, flowing into the molds, thereby giving such a state that is as close as continuation of the cooling step. Not only can the heating medium be discharged without passing through many fine pipings involved in mold heating and cooling inside the molds large in flow resistance but also air smaller in flow pressure loss than liquid is used to scavenge the heating medium in the previous step. It is thus possible to shorten the time necessary for discharging the cooling-use medium inside the heating medium circuit and the supply piping in the molds. Further, since the mold bypass on-off valve is closed and, thereafter, the scavenging compressed air is forcibly supplied to the flow path inside the molds, it is possible to reliably discharge the heating-use medium inside the molds before the heating medium in the next step is supplied.

The inventions related to the above-described fourteenth aspect and the fifteenth aspect involve a method for discharging a cooling-use medium in which at the timing when the mold temperature controller is switched from one step to another, the supply of the cooling-use medium in the previous step is halted, thereafter, the mold bypass on-off valve which is installed on the mold bypass piping to couple the heating medium supply piping with the discharge piping thereof is opened and at the same time the supply of the scavenging compressed air is started, thereby, the cooling-use medium remaining inside the supply-side junction piping of the cooling-use medium is purged by scavenging compressed air by way of the mold bypass piping into the discharge-side junction piping, thereafter, the on-off valve of scavenging compressed air is closed, with the mold bypass on-off valve kept opened, the supply of the heating-use medium in a next step is started, and at the time point when the heating-use medium arrives in the vicinity of the molds from the supply piping, the mold bypass on-off valve is closed to feed the heating-use medium into the molds.

According to the method for discharging a cooling-use medium, it is possible to prevent the mold temperature from being lower than a target cooling completion temperature and excessively cooled because the cooling-use medium remaining inside the supply-side junction piping of the heating medium is pushed by the heating medium in the next step on switching the step, flowing into the molds, thereby giving such a state that is as close as continuation of the cooling step. Not only can the heating medium but also the scavenging compressed air inside the supply piping from a supply source of the scavenging compressed air to the mold bypass on-off valve be discharged without passing through many fine pipings involved in mold heating and cooling inside the molds large in flow resistance. It is thus possible to shorten the time necessary for arriving at the molds from the supply source of the heating-use medium and also promptly adjust the mold temperature.

The invention related to the above-described eighteenth aspect is effective in further shortening the time necessary for discharging the heating medium in the previous step as described in the above-described sixth aspect to the fifteenth aspect.

MODE FOR CARRYING OUT THE INVENTION

Figure 1:
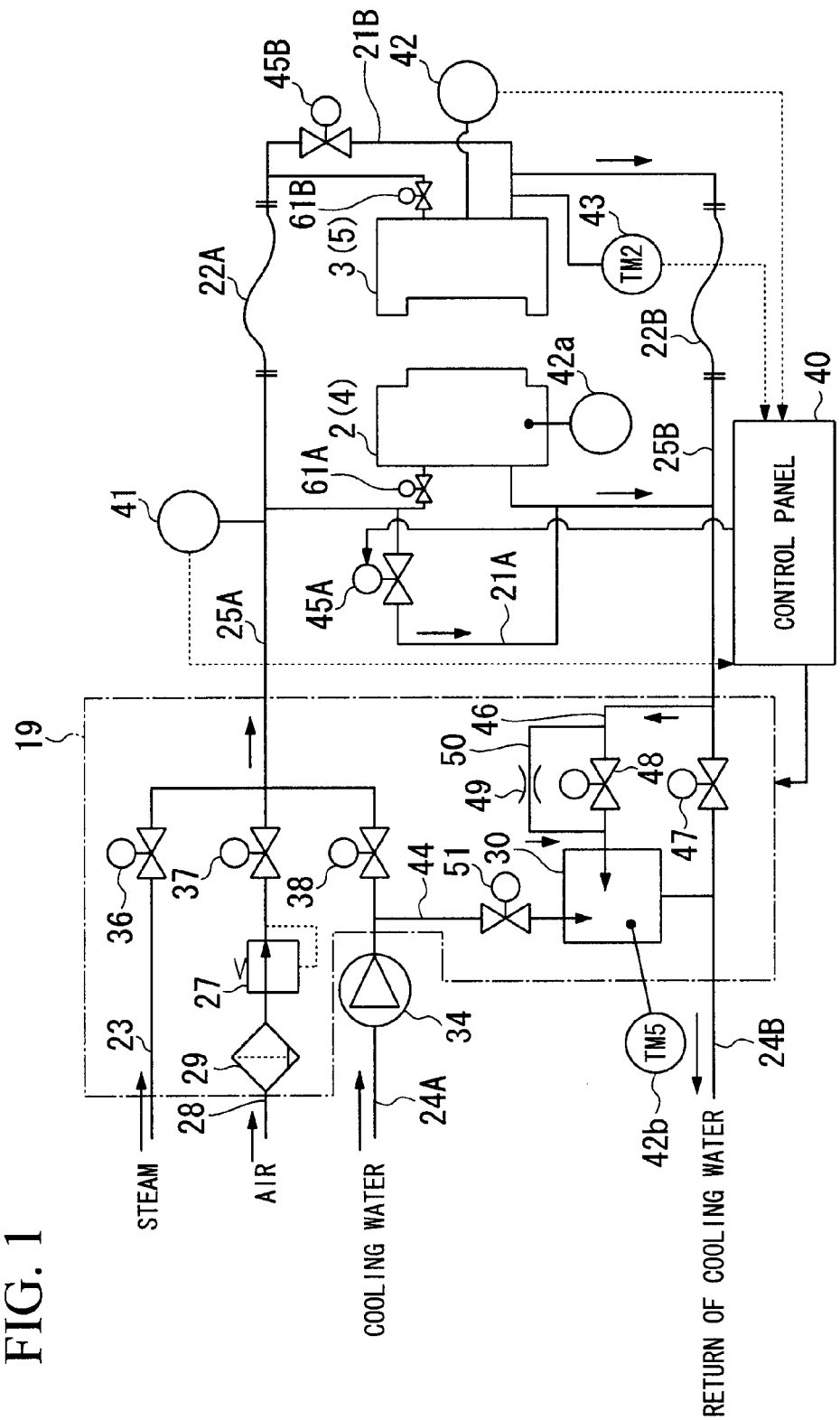
FIG. 1 is a pattern diagram showing a mold heating circuit of an embodiment of the present invention.

In controlling the heating of a mold used in an injection molding device, etc., an explanation will be made of two aspects of the constitution of a heating/cooling-use medium supply/discharge circuit of molds capable of quickly conducting heating and cooling. An explanation will also be made for a temperature control method for heating and cooling the molds by using the heating/cooling-use medium supply/discharge circuit. In the present embodiment, a pattern diagram of the heating/cooling-use medium circuit of molds does not show a resin injecting path, and an injection unit, etc.

In the present embodiment, steam is used as a heating-use medium and cooling water is used as a cooling-use medium in both a fixed mold and a movable mold of the above-described injection molding device. There are provided a supply-side manifold continuing to the supply piping of scavenging compressed air, a discharge-side manifold continuing to the discharge piping, and nests which internally house many heating/cooling common-use fine pipings to which both manifolds are joined. A mold temperature sensor is also installed. However, it is acceptable that a high-temperature fluid such as high-temperature compressed water other than steam is used as a heating-use medium or a low-temperature fluid other than cooling water is used as a cooling-use medium.

The heating/cooling-use medium circuit is controlled so as to repeat a molding cycle in an injection molding step, the fixed mold and the movable mold are closed to effect clamping, before injection of a resin, the heating-use medium is returned to the molds to heat the molds up to a temperature appropriate for injection of the resin, after the resin is injected, the medium is switched to the cooling-use medium, and the cooling-use medium is returned to the molds to cool the molds down to a temperature equal to or lower than the temperature at which the resin is solidified. The above-described constitution and adjustment/control of mold temperature are included in known art which have been applied to conventional injection molding machines.

Aspects of the control executed by claims of the present invention are present by various embodiments in combination of claims. Hereinafter, representative embodiments will be explained in detail.

In the embodiments of the present invention, the heating/cooling-use medium circuit of the molds is applicable to both the fixed side and the movable side. However, in view of quality, etc. required for injection-molded articles, the circuit may be applied only to the fixed side mold or the movable side mold. Where the circuit is applied only to the fixed side or the movable side, it is possible to omit a mold temperature sensor and bypass piping which are inherently associated with one of the movable mold and the fixed mold which is not controlled for heating or cooling.

Further, in the present embodiment, determination of a mold temperature and determination of the passed heating medium are applicable to both the fixed side and the movable side. However, it is acceptable that determination of reaching a heating target temperature in a heating step and reaching a cooling target temperature in a cooling step, etc., as well as determination of a completed switch of the heating medium by a passed heating medium sensor are made by using the state of only one of the fixed side mold and the movable side mold, thereby allowing the steps to proceed. It is acceptable that the steps are allowed to proceed on the condition that determination is duly made for both the fixed side and the movable side. It is also acceptable that the steps are allowed to proceed on the condition that determination is duly made for one of the fixed side and the movable side.

First Embodiment

An explanation will be made of the first embodiment by referring to the drawings.

Figure 2:
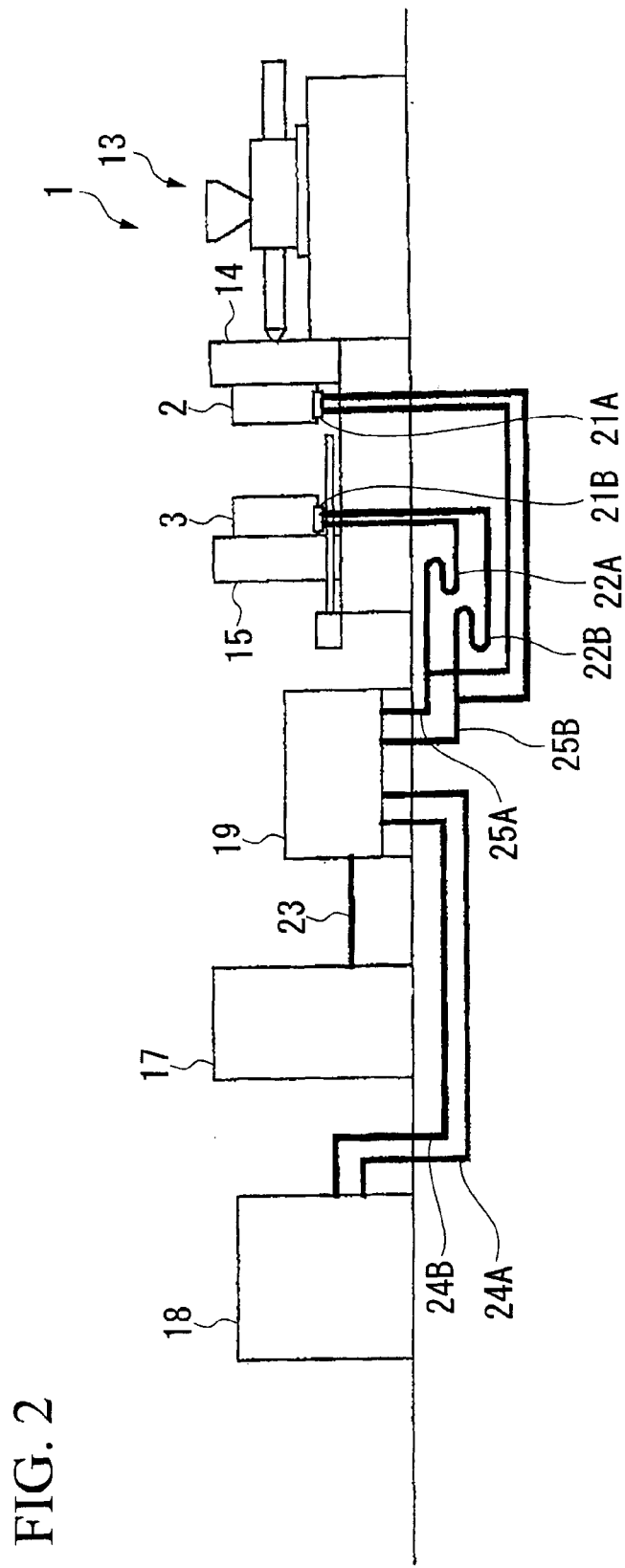
FIG. 2 is a lateral layout diagram showing an injection molding device of the first embodiment having the mold heating circuit given in FIG. 1.
Figure 4:
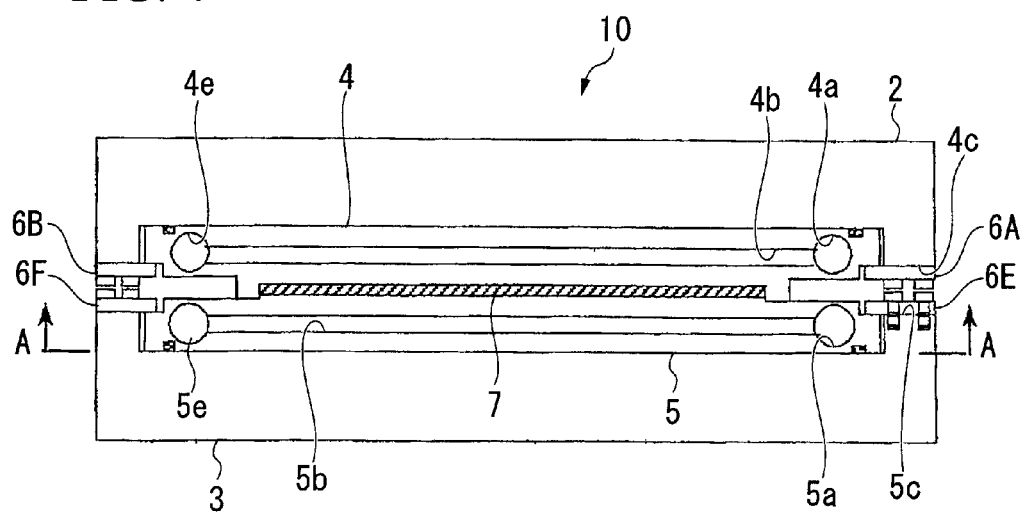
FIG. 4 is a side elevational view showing an example of molds applicable to the mold heating circuit given in FIG. 1.
Figure 5:
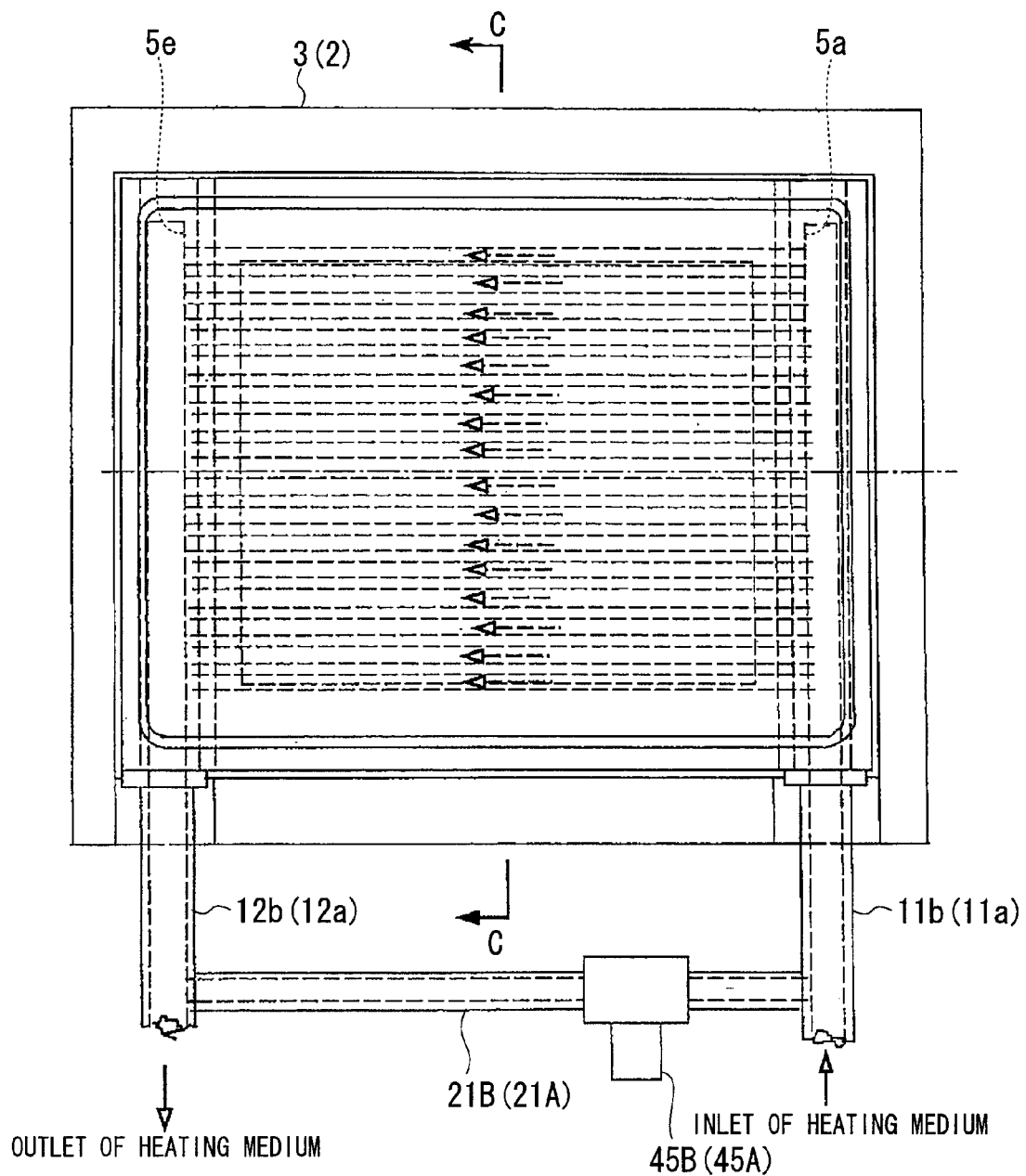
FIG. 5 is a front elevational view of nests which are shown by the cross section of the molds taken along line A-A in FIG. 4.
Figure 6:
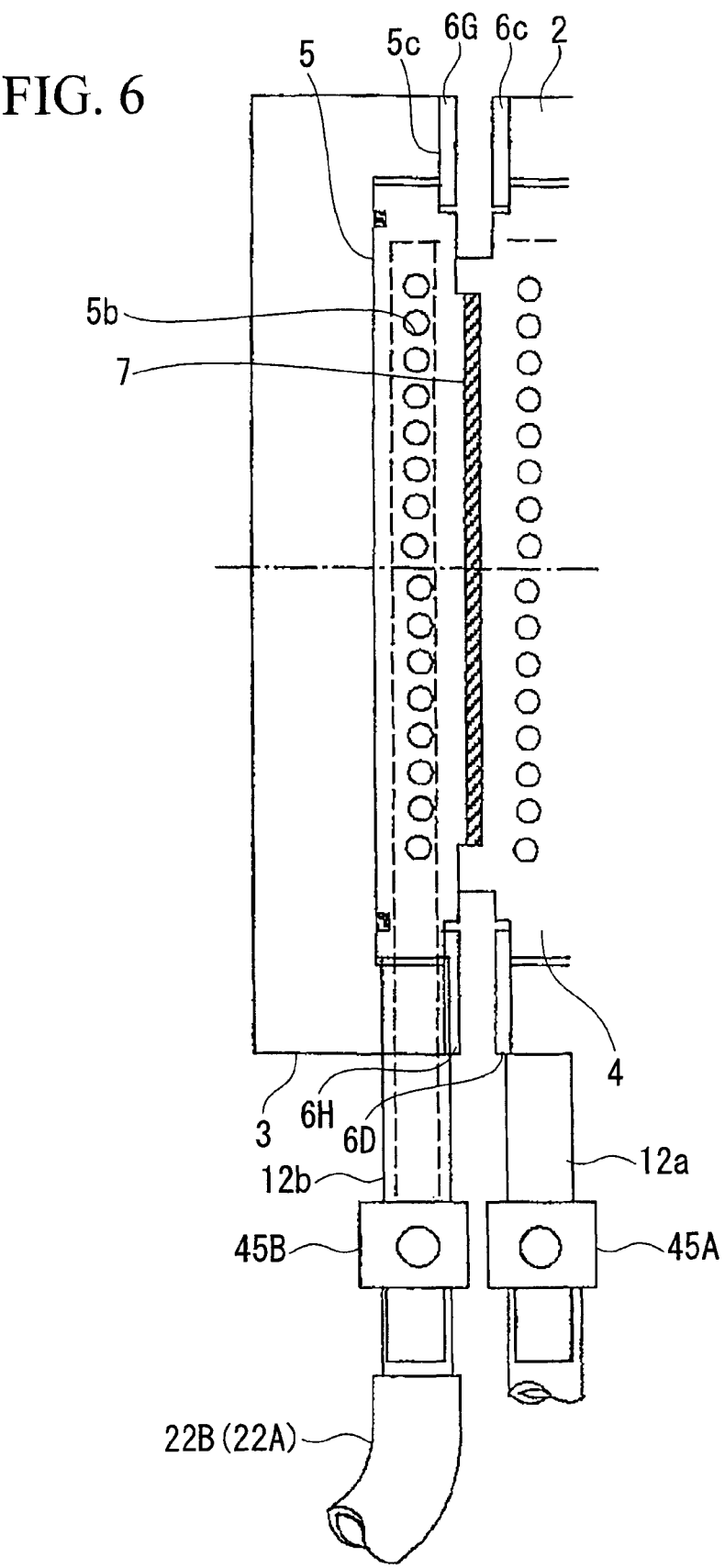
FIG. 6 is a cross sectional view taken along line C-C in FIG. 5.
Figure 7:
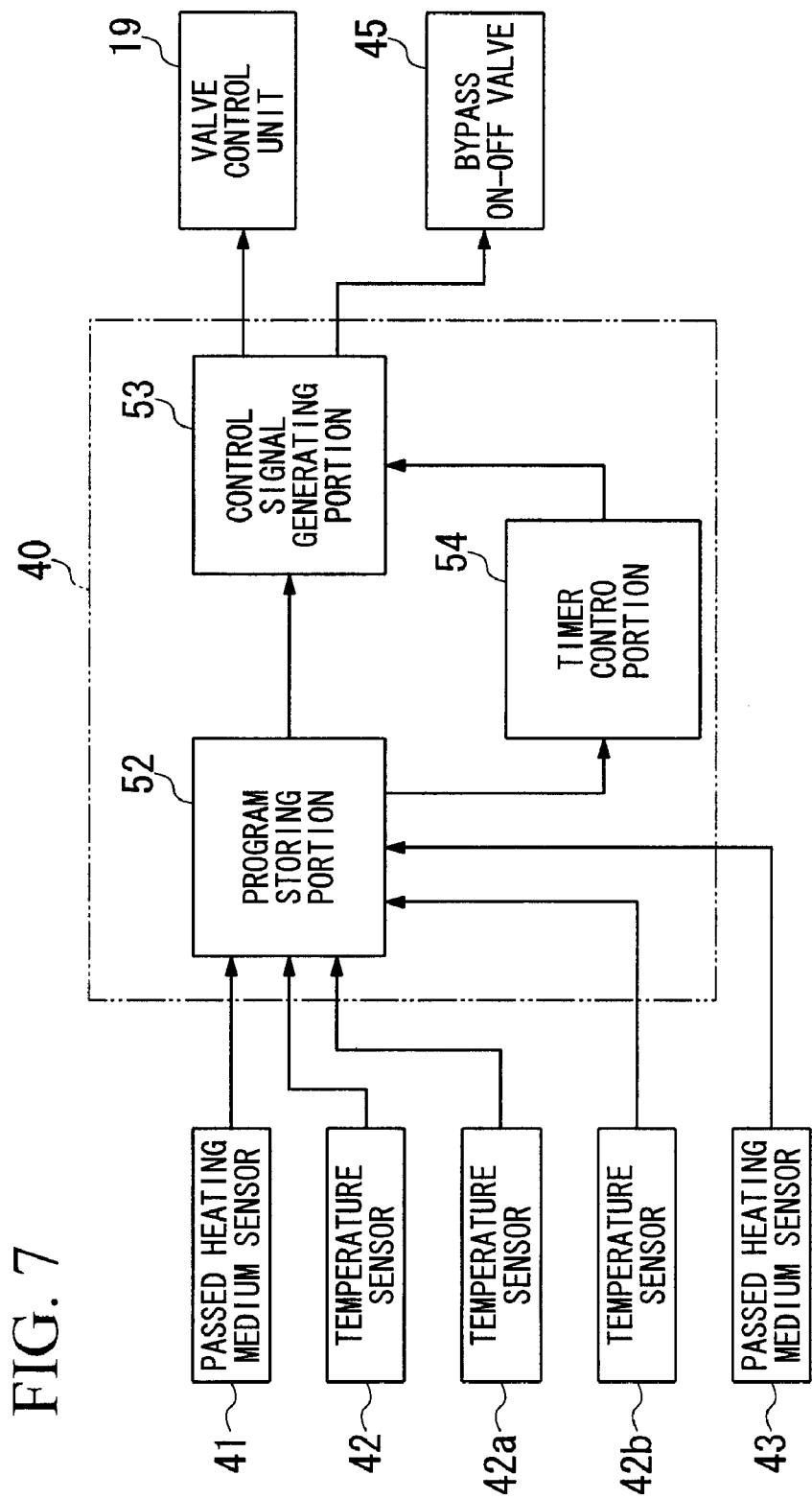
FIG. 7 is a block diagram showing the constitution of the control panel given in FIG. 1.
Figure 8:
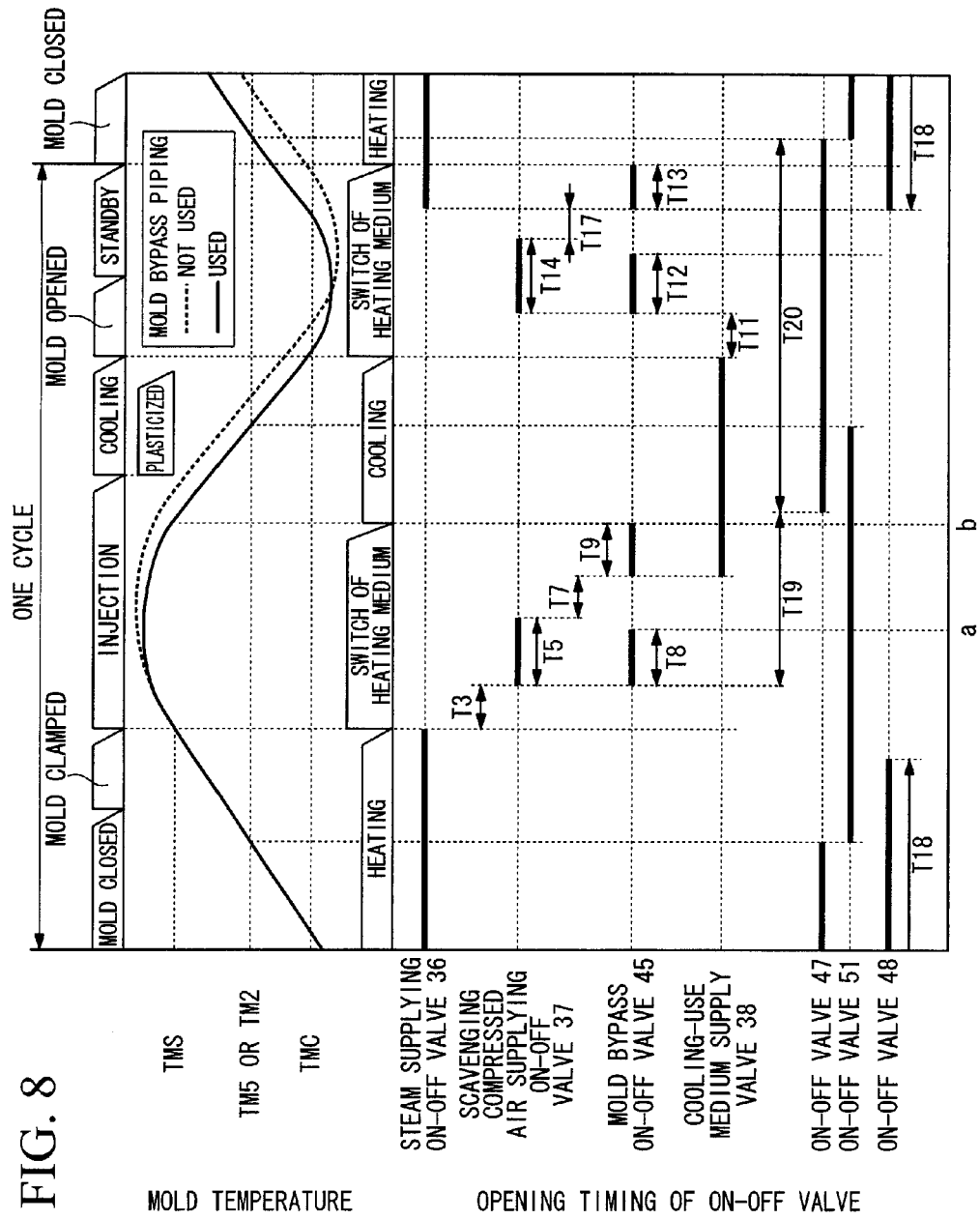
FIG. 8 is a diagrammatic drawing showing a mold temperature and opening timing of each on-off valve corresponding to a molding step of the injection molding device having the mold heating circuit in FIG. 2 and FIG. 3.

FIG. 1 is a pattern diagram showing a mold heating circuit related to an embodiment of the present invention. FIG. 2 is a lateral layout diagram of an injection molding device of the first embodiment having the mold heating circuit given in FIG. 1. FIG. 4 is a side elevational view showing an example of molds applicable to the mold heating circuit given in FIG. 1. FIG. 5 is a front elevational view of nests which are shown by the cross section of the molds taken along line A-A in FIG. 4. FIG. 6 is a cross sectional view taken along line C-C in FIG. 5. FIG. 7 is a block diagram showing the constitution of the control panel given in FIG. 1. FIG. 8 is a diagrammatic drawing showing a mold temperature and opening/closing timing of each on-off valve corresponding to a molding step of the injection molding device including the mold heating circuit in FIG. 1.

In the lateral layout diagram of FIG. 2 showing the injection molding device, the injection molding device 1 is provided with a fixed mold 2 attached to an injection unit 13, and a fixed platen 14 and a movable mold 3 attached to a movable platen 15. A boiler 17 for generating steam which is an accessory heating equipment, cooling equipment 18 such as a cooling tower which is a cooling equipment and a valve controller unit (mold temperature controller) 19 are located at a place away from the injection molding device 1.

The valve controller unit (mold temperature controller) 19 stores, as shown in FIG. 1, steam supply piping 23, a steam supplying on-off valve 36, scavenging compressed air supply piping 28, an air filter 29, a scavenging compressed air decompression valve 27, a scavenging compressed air supplying on-off valve 37, cooling water supply piping 24A, a cooling water supplying on-off valve 38, an on-off valve 47 for discharging a used heating medium, a discharge piping on-off valve 48 for feeding a heating medium from discharge-side junction piping 25B of the molds to a mixer 30 with a variable throttle valve 49 in parallel, an on-off valve 51 installed on piping for allowing cooling water to flow into the mixer 30, etc. The reference numeral 34 denotes a cooling water pump. As injection molding equipment becomes larger, the accessory equipment thereof is made larger accordingly and, as a result, located at a place further away from the injection molding device.

Steam is fed through the steam supply piping 23 from the boiler 17 to the valve controller unit (mold temperature controller) 19, cooling water is fed through the cooling water supply piping 24A from the cooling equipment 18 such as a cooling tower to the valve controller unit (mold temperature controller) 19, and used cooling water is collected through the cooling water discharge piping 24B by the cooling equipment 18 such as the cooling tower. Steam, cooling water and scavenging compressed air from the valve controller unit (mold temperature controller) 19 to nests 4, 5 of the molds 2, 3 are supplied and discharged by way of common supply-side junction piping 25A and common discharge-side junction piping 25B. Flexible pipings 22A, 22B are connected to the junction pipings 25A, 25B continuing to the nest 5 of the movable mold 3 so as to correspond to mold opening/closing movement of the movable mold 3. The fixed mold 2 and the movable mold 3 are respectively provided with mold bypass pipings 21A, 21B which bypass an inlet and an outlet of the heating medium. Mold bypass on-off valves 45A, 45B are installed on the mold bypass pipings 21A, 21B.

A passed heating medium sensor (temperature sensor, etc.) 41 for detecting passage of steam, scavenging compressed air and cooling water is installed on the supply-side junction piping 25A of the heating medium near the fixed mold 2. Further, a temperature sensor 42a for detecting the temperature of the cavity face of the nest 4 of the fixed mold 2 is installed on the fixed mold, while a temperature sensor 42 for detecting a temperature of the cavity face of the nest 5 of the movable mold 3 is installed on the movable mold. Still further, a passed heating medium sensor (temperature sensor, etc.) 43 for detecting passage of steam, scavenging compressed air and cooling water is installed on the heating medium discharge piping of the movable mold 3. It is acceptable that the temperature sensors 42a, 42 arranged on the cavity faces of the nests 4 and 5 are installed in any given plural number to check the nests 4, 5 for temperature distribution, thereby selecting the mean temperature for control, or a temperature determination program is used to provide selective control, or a representative sensor is decided for control.

An on-off valve 47 is installed on the discharge-side junction piping 25B of the molds 2, 3, and the mixer 30 for mixing steam and cooling water discharged from the molds is also installed thereon in parallel with the on-off valve 47. Installed is coupling piping 44 for coupling the mixer 30 with the cooling water supply piping 24A of the cooling equipment 18 such as the cooling tower. An on-off valve 51 is installed on the coupling piping 44, and a high-temperature heating medium is detected by the passed heating medium sensor 43, or the timer, etc., housed inside the control panel 40 in anticipation of a flowing state of steam are controlled to open and close the on-off valves 47, 48, 51, thereby controlling the flow of the heating medium into the mixer 30. On discharge piping 46 between the discharge-side junction piping 25B and the mixer 30, discharge piping bypass piping 50 in parallel with the discharge piping on-off valve 48 is installed, and by providing a variable throttle valve 49 capable of adjusting the throttle amount to the discharge piping bypass piping 50, the flow rate of steam can be suppressed. Thereby, it is possible to increase the pressure of a heating-use medium inside the molds at a large flow rate, with steam suppressed to a lower flow rate, and it is also possible to suppress a decrease in steam temperature. Further, steam is discharged at a suppressed flow rate, thereby allowing steam to enter into the molds in an appropriate amount and attaining well-balanced heating, which then enables suppression of noise and vibration of the mixer 30.

The injection molding device 1 and the valve controller unit (mold temperature controller) 19 or the control panel 40 in association with these devices are installed. The control panel 40 is, as shown in FIG. 7, provided with a program storing portion 52 which stores a temperature determination program made up of a mold temperature determination program and a passed heating medium determination program, a timer control portion 54 for outputting a time setting signal, and a control signal generating portion 53 for generating a control signal which controls so as to switch and supply steam, cooling water and scavenging compressed air to the molds 2, 3 by the valve control unit (mold temperature controller) 19 and a control signal which conducts molding motions by the molds 2, 3 such as mold closing, mold opening and injection/filling on the basis of determination results by the temperature determination program and the time setting signal.

Next, an explanation will be made for a constitution of the molds by referring to FIG. 4, FIG. 5 and FIG. 6. The nest 4 having a heating medium path 4$b$ is fitted into the fixed mold 2 and fixed to the fixed mold 2, with the four sides thereof being pressed by pressing plates 6A, 6B, 6C, 6D. Further, the nest 5 having a heating medium path 5$b$ is fitted into the movable mold 3 and fixed to the movable mold 3, with the four sides thereof being pressed by pressing plates 6E, 6F, 6G and 6H. When the movable mold 3 comes closer to the fixed mold 2, allowing the nest 4 to be in contact with the nest 5, there is formed a cavity which molds a molded article 7 on a mating face.

The nest 4 forms on both sides manifolds 4$a$, 4$e$ which are cylindrical holes, and a plurality of heating medium paths 4$b$ penetrate between both the manifolds 4$a$, 4$e$. Inlet piping 11$a$ is coupled to the manifold 4$a$ on the inlet side of a heating medium, while outlet piping 12$a$ is coupled to the manifold 4$e$ on the outlet side of the heating medium. The inlet piping 11$a$ and the outlet piping 12$a$ are communicatively connected by the mold bypass piping 21A, and the on-off valve 45A is installed on the mold bypass piping 21A. Similarly, the nest 5 forms on both sides manifolds 5$a$, 5$e$, and a plurality of heating medium paths 5$b$ penetrate between both the manifolds 5$a$, 5$e$. Inlet piping 11$b$ is coupled to the manifold 5$a$ on the inlet side of the heating medium, while outlet piping 12$b$ is coupled to the manifold 5$e$ on the outlet side of the heating medium. The inlet piping 11$b$ and the outlet piping 12$b$ are communicatively connected by the mold bypass piping 21B, and the on-off valve 45B is installed on the mold bypass piping 21B.

If the nests 4, 5 of the molds are attempted to be heat-exchanged evenly and as quickly as possible in a molded article 7 which is thin and large in area, the heating medium paths 4$b$, 5$b$, which are fine pipings, are made thin and provided in a large number. And, the paths 4$b$, 5$b$ are 2 to 100 times greater in the respective flow resistances than the mold bypass pipings 21A, 21B. Further, in a large-sized heating-medium supplying discharge piping circuit in which a distance between the valve control unit 19 for switching the supply of a heating medium and the molds 2, 3 is long, and the capacity of piping connecting the distance between them is greater than the flow path volume of the nests 4, 5 of the molds, the mold bypass on-off valves 45A, 45B which make, in particular, the mold bypass pipings 21A, 21B passable are controlled for switching to opening or to closing, by which the switching time of a heating medium can be effectively shortened and thermal energy loss can be decreased at the same time.

An explanation will be made of a mold temperature and opening timing of each on-off valve corresponding to a molding step of the injection molding device by referring to FIG. 1 and FIG. 8. The mold temperature control circuit is controlled by such a method that heating and cooling steps are repeated in the mold temperature control circuit, during which scavenging compressed air is supplied. In a heating step of the molds, the steam supplying on-off valve 36 of the steam supply piping 23 is opened to supply steam via the supply-side junction piping 25A to the fixed mold 2 and the movable mold 3, thereby heating the nests 4, 5. When the mold temperature determination program inside the program storing portion 52 determines that a mold temperature detected by one or both of the temperature sensors 42 and 42$a$ of the molds has reached a mold upper-limit preset temperature (TMS), the steam supplying on-off valve 36 is closed.

In the heating step of the molds, introduction of a heating medium to the mixer 30 is controlled, the discharge piping on-off valve 48 is kept opened partway of the heating step, the heating medium is allowed to flow into the mixer 30 through the discharge piping on-off valve 48 and the variable throttle valve 49. In a later stage of the heating step, the discharge piping on-off valve 48 is closed and the heating medium is allowed to flow into the mixer 30 only through the variable throttle valve 49. The time when the discharge piping on-off valve 48 is opened is preset by a timer T18, the variable throttle valve 19 is adjusted for divergence and the timer T18 is preset and adjusted in such a manner that the heating time can be shortened as much as possible.

At the time point of starting the cooling step of the molds after completion of the heating step of the molds, steam is discharged from the supply piping. Simultaneously with closing of the steam supplying on-off valve 36 in the previous step, a heating medium switch delay timer T3 is started. Time is completed by the heating medium switch delay timer T3, by which the mold bypass on-off valves 45A, 45B are opened to make the mold bypass pipings 21A, 21B passable. And, the scavenging compressed air supplying on-off valve 37 is preset by a timer T5 so as to be opened for a short time, and steam inside the supply-side junction piping 25A is directly bypassed to the discharge-side junction piping 25B.

Simultaneously with opening of the scavenging compressed air supplying on-off valve 37, the mold bypass on-off valve 45 is also opened to start a timer T8. Time is completed by the timer 8, by which the mold bypass on-off valve 45 is temporarily closed. The motion of closing the mold bypass on-off valve 45 may be conducted not by completion of the time preset by the timer 8 but at a time point a when the passed heating medium sensor 41 detects air.

After completion of the time preset by the timer T5, the cooling water supplying on-off valve 38 is opened by a signal indicating completion of the time preset by a cooling start delay timer T7 to feed cooling water. At the same time, the mold bypass on-off valve 45 is again opened to start a timer T9. The mold bypass on-off valve 45 is temporarily closed, by which scavenging compressed air is forcibly fed into molds, and a heating-use medium remaining inside the molds can be discharged. At a time point b when the passed heating medium sensor 41 composed of a temperature sensor installed on the supply-side piping detects cooling water or upon completion of the time preset by the timer T9, the mold bypass on-off valves 45A, 45B are closed. In FIG. 8 which shows the passed heating medium sensor 41 as a temperature sensor, it is acceptable that the passed heating medium sensor 41 is a pressure sensor. It is also acceptable that the motion of closing the scavenging compressed air supplying on-off valve 37 is not conducted by the timer T5 but conducted at the time point a when the passed heating medium sensor 41 detects air.

Figure 10:
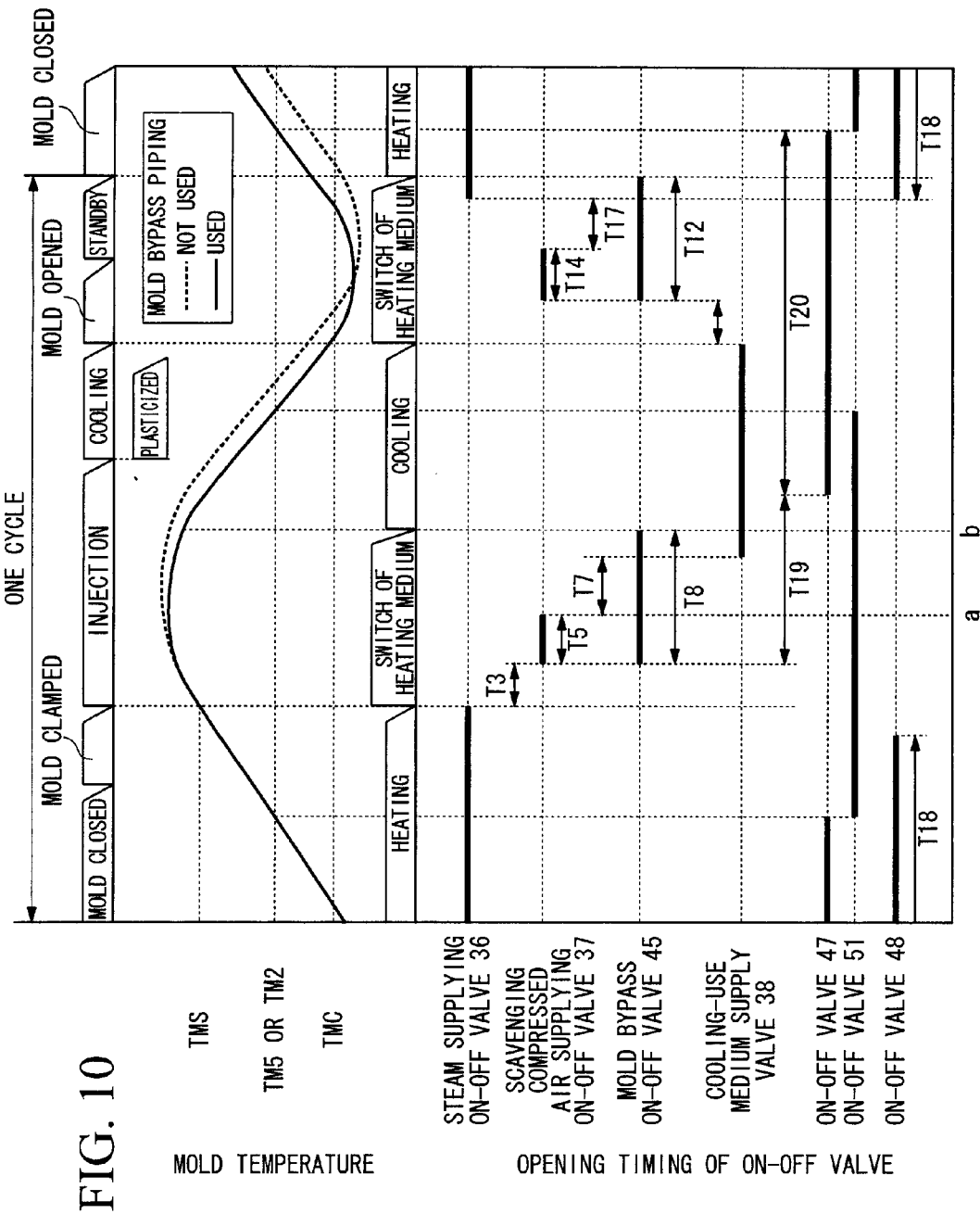
FIG. 10 is a diagrammatic drawing showing a mold temperature and opening timing of each on-off valve corresponding to the molding step of the first embodiment.

In FIG. 8, the mold bypass on-off valve 45 is temporarily closed before the supply of scavenging compressed air is halted and opened again. However, it is acceptable that in order to shorten the time, the mold bypass on-off valve 45 is not temporarily closed but the scavenging compressed air is discharged by a heating medium in a next step, with the valve kept opened. FIG. 10 is a diagrammatic drawing which shows a mold temperature and opening timing of each on-off valve corresponding to the molding step in this case.

Further, in the first embodiment, the mold bypass on-off valves 45A, 45B are closed at the same timing. It is, however, acceptable that the mold bypass on-off valves 45A, 45B are independently opened and closed at a different time by using a timer, etc. The mold bypass on-off valves 45A, 45B are closed at a different time, thereby even where a heating medium in the previous step remains in different amounts inside piping which is different in length between a bifurcation part of the junction piping 25 to the fixed mold 2 and a bifurcation part of the junction piping 25 to the movable mold 3, appropriate time for discharging the heating medium in individual remaining amounts can be independently applied as the opening times of the respective bypass on-off valves 45A, 45B. It is thus possible to reliably discharge the heating medium in the previous step into the discharge piping via the bypass circuit without passing through the respective molds.

In the cooling step, the mold bypass on-off valves 45A, 45B and the on-off valve 47 of the discharge piping are opened and closed at the following timing. After the cooling water supplying on-off valve 38 for a cooling-use medium is opened, a signal of the passed heating medium sensor 41 which has detected the cooling-use medium or completion of the time preset by the timer T9 is used to close the mold bypass on-off valves 45A, 45B, thereby closing the mold bypass pipings 21A, 21B. At the same time when the steam supplying on-off valve 36 is closed, a timer T19 is started. And a signal counted up by the timer T19 is used to open the on-off valve 47, thereby the discharge-side junction piping 25B is directly allowed to lead to the cooling water discharge piping 24B. The timer T19 is preset for such time that a temperature of a heating-use medium flowing into the mixer 30 from the discharge piping 46 is anticipated to be decreased to a temperature at which no problem is posed if the heating-use medium is directly discharged via the on-off valve 47 into the cooling water discharge piping 24B. At the timing when the time is completed by the timer T19, the on-off valve 47 is opened to accelerate the return of cooling water to the nests 4, 5.

At the time point of starting the next standby step after completion of the cooling step of the molds, cooling water in the supply piping and the heating medium flow paths inside the molds is discharged as follows. When one or both of the temperature sensors 42a, 42 of the nests 4, 5 detect a preset cooling lower-limit temperature (TMC) has been reached, the cooling water supplying on-off valve 38 is closed to halt the supply of cooling water and a mold heating medium switch delay timer T11 is started. At the time point when the time is completed by the timer T11, the mold bypass on-off valves 45A, 45B are opened to make the mold bypass pipings 21A, 21B passable, and the scavenging compressed air supplying on-off valve 37 is opened to discharge a cooling-use medium (cooling water) inside the supply-side junction piping 25A into the discharge-side junction piping 25B. Simultaneously with opening of the scavenging compressed air supplying on-off valve 37, a timer T12 is started which is preset in anticipation of complete discharge of cooling water inside the supply piping. Upon completion of the time preset by the timer T12, the mold bypass on-off valves 45A, 45B are temporarily closed to close the mold bypass pipings 21A, 21B. The supply of scavenging compressed air is halted by using a timer T14 preset in anticipation of complete discharge of cooling water inside the nests 4, 5 into the discharge-side junction piping 25B.

Simultaneously with completion of the time preset by the timer T14, a heating start delay timer T17 is started. A time completion signal of the timer T17 is used to open the steam supplying on-off valve 36, thereby feeding steam. At the same time, the mold bypass on-off valve 45 is opened again to discharge scavenging compressed air through the mold bypass circuit. The mold bypass on-off valve 45 is closed after passage of the time preset by the timer T13.

At the time point of starting a heating step of the molds after completion of the standby step, timing when steam is allowed to pass through the mixer 30 is adjusted by the timer T17 so as to give timing from complete discharge of cooling water inside the molds to start of the next heating step of the molds. In the mixer 30, steam is condensed into water and drained accordingly or collected into the cooling equipment 18 such as a cooling tower or the boiler 17. For a while after the supply of steam is started, steam is condensed inside piping and the molds. Therefore, it takes time for high-temperature steam to arrive at the discharge piping. In the time, since a heating medium discharged from the molds into the junction piping 25B on the drain side is lower in temperature, the on-off valve 47 may be opened. It is also acceptable that the mold bypass on-off valves 45A, 45B are opened for a short time from the start of supplying steam, thereby accelerating arrival of steam at the molds.

Cooling water is supplied to the mixer 30 at the following timing. Cooling water may be kept supplied from the coupling piping 44 to the mixer 30, with the on-off valve 51 opened constantly. It is, however, acceptable that in order to reduce usage of cooling water, only when a high temperature is found by a temperature sensor 42b (TM5) for detecting a temperature of the mixer 30 itself or a temperature inside the mixer 30, the on-off valve 51 is opened to supply cooling water. It is also acceptable that while a temperature higher than a preset temperature is found by a passed heating medium sensor 43 (TM2) for detecting the temperature inside the junction piping 25B on the drain side, the on-off valve 51 is opened to supply cooling water.

A timer T5 is to preset time for feeding scavenging compressed air between high-temperature steam supplied in the previous step and cooling water to be supplied in the next step. In a heating step, the timer T5 is started by using completion of the time preset by the timer T3 which starts at the time point when the mold temperature has reached a preset mold upper-limit temperature TMS, that is, a target heating temperature, or a signal depending on progress of an injection step. As the signal depending on progress of the injection step, an injection starting signal sent from a control device on the main body of an injection molding machine or an external signal which is a time completion signal from a preset pressure keeping timer, etc. may be used. Simultaneously, with start of the timer T5, the scavenging compressed air supplying on-off valve 37 and the mold bypass on-off valves 45A, 45B are opened to discharge steam remaining inside the supply piping, that is, a heating medium in the previous step, into the discharge piping without passing through the molds, thereby preventing the molds from being excessively heated when the mold temperature is in excess of a target heating completion temperature. A major purpose of supplying scavenging compressed air is to prevent shock and vibration caused by a heating-use medium or a cooling-use medium directly in contact with each other inside the piping and the molds. Simultaneously, with completion of the time preset by the timer T5, the scavenging compressed air supplying on-off valve 37 is closed. Further, it is acceptable that a motion of closing the scavenging compressed air supplying on-off valve 37 is conducted not by the timer T5 but conducted at the time point a when the passed heating medium sensor 41 detects air.

A timer T7 is used to preset start timing of a cooling step. The cooling step is started at the same time when the scavenging compressed air supplying on-off valve 37 is closed after completion of the heating step. Then, upon completion of the time preset by the timer T7, the cooling water supplying on-off valve 38 is opened. Where cooling starting timing is determined by using a signal depending on progress of the injection step, it is acceptable to start cooling not by using the timer T7 but by using this external signal. As with the timer T5, as the signal depending on progress of the injection step, an injection starting signal sent from a control device on the main body of an injection molding machine or an external signal, that is, a time completion signal from a preset pressure keeping timer, etc., may also be used.

A timer T12 is to set bypass passage time of scavenging compressed air after completion of the cooling step. In the cooling step, upon completion of the time preset by a timer T11 which starts when a mold temperature has reached a target cooling lower-limit temperature (TMC), the timer T12 is started. That is, simultaneously with start of the timer T11, the cooling water supplying on-off valve 38 is closed to complete the time preset by the timer T11, and the scavenging compressed air supplying on-off valve 37 and the mold bypass on-off valves 45A, 45B are also opened. Cooling water in which scavenging compressed air remains inside the supply-side piping is substantially discharged through the mold bypass on-off valves 45A, 45B into the discharge-side piping. It is preferable that the timer T12 presets the time when scavenging compressed air is anticipated to arrive near the molds. When the mold bypass on-off valves 45A, 45B are closed simultaneously with completion of the time preset by the timer T12, all the scavenging compressed air is sent to the heating medium circuits 4b, 5b of the molds. Therefore, even a mold having a heating medium circuit large in inflow resistance is able to discharge cooling water remaining inside the mold into discharge piping in a short time. At the same time, it is possible to reduce the amount of cooling water passing through the inside of the mold in discharging the cooling water. Then, it is possible to suppress the phenomenon by which the mold temperature is undesirably decreased in discharging the cooling water.

Of these two effects, the latter becomes more effective in the case where the on-off valves 61A, 61B are installed on their way to the heating medium supply piping continuing to molds and on a side closer to the molds from positions at which the mold bypass pipings 21A, 21B connected to the mold bypass on-off valves 45A, 45B are connected to the supply-side junction piping 25A, thereby when the mold bypass on-off valves 45A, 45B are opened, cooling water is controlled so as not to flow into the heating medium circuit of the molds. It is acceptable that, in place of the motion of closing the mold bypass on-off valves 45A, 45B by using completion of the time preset by the timer T12, a passed heating medium sensor (not shown) is installed on the heating medium supply piping in the vicinity of the molds and at a position closer to the valve control unit 19 than positions at which the mold bypass pipings 21A, 21B connected to the mold bypass on-off valves 45A, 45B are connected to the supply-side junction piping 25A of a heating medium, and this sensor is used to detect arrival of scavenging compressed air, thereby conducting the motion of closing the mold bypass on-off valves 45A, 45B.

It is preferable that the timer T14 presets the time when cooling water remaining at the heating medium circuit inside the molds is anticipated to be discharged into the discharge piping by scavenging compressed air upon closing of the mold bypass on-off valves 45A, 45B after completion of the cooling step. Simultaneously with the motion of opening the mold bypass on-off valves 45A, 45B, the timer T14 is started. Upon completion of the time preset by the timer T14, the scavenging compressed air supplying on-off valve 37 is closed, and the on-off valve 47 located between the discharge piping continuing from the molds and the cooling water discharge piping 24B continuing to the cooling equipment 18 such as a cooling tower is also closed. It is acceptable that the motion of closing the scavenging compressed air supplying on-off valve 37 for discharging cooling water from the molds is not conducted by the timer T14 but conducted by detecting arrival of scavenging compressed air by a passed heating medium sensor 43 installed on heating medium discharge piping at a position closer to the molds than positions at which the mold bypass pipings 21A, 21B connected to the mold bypass on-off valves 45A, 45B are connected to the discharge-side junction piping 25A of a heating medium.

A timer T17 is to preset standby time up to the start of heating the molds. Simultaneously with the motion of closing the scavenging compressed air supplying on-off valve 37 on discharging a cooling-use heating medium, the timer T17 is started. Upon completion of the time preset by the timer T17, the steam supplying on-off valve 36 is opened for heating the molds in the next injection motion, thereby starting a heating step. It is acceptable that the motion of opening the on-off valve 36 of the heating-use medium is not conducted by the timer T17 but conducted by using a signal depending on progress of the injection step or to a timer, etc., for determining intervals of start timing of the heating step which are installed on the valve controller unit (mold temperature controller) 19. As the signal depending on progress of the injection step, an injection starting signal sent from a control device on the main body of an injection molding machine or an external signal, which is a time completion signal from a preset pressure keeping timer, etc., may be used.

It is also acceptable that during completion of the time preset by a timer for presetting a certain time prior to starting the heating step or during the time in which a pressure value detected by a pressure sensor installed on the supply piping or the discharge piping is lower than a predetermined value, a residual-pressure removing step for returning the pressure inside the circuit to ordinary pressure is conducted. Removal of pressure remaining inside the piping makes it easier to supply steam and to effectively shorten the heating time.

It is preferable that a timer T18 shown in the diagrammatic drawing of FIG. 8 presets timing of the motion of closing the discharge piping on-off valve 48 located between heating medium discharge piping continuing to the molds and the mixer 30. Simultaneously with the motion of opening the steam supplying on-off valve 36, the timer T18 is started to commence the heating step. Upon completion of the time preset by the timer T18, the motion of closing the discharge piping on-off valve 48 located between the discharge-side junction piping 25B of a heating medium continuing from the molds to the mixer 30 is conducted. In the state that the discharge piping on-off valve 48 is opened in the first half of the heating step, the heating medium discharged from the molds by circumventing the variable throttle valve 49 is allowed to flow into the mixer 30. It is thus possible to increase the flow rate of steam, irrespective of how much the variable throttle valve 49 is narrowed. Thus, as compared with the second half of the heating step which is conducted, with the discharge piping on-off valve 48 kept closed, steam can be supplied in a large amount to increase the temperature elevating speed in the molds.

Upon completion of the time preset by the timer T18, the discharge piping on-off valve 48 is closed, thereby allowing steam to pass through the variable throttle valve 49. Therefore, it is possible to raise the pressure of steam and increase the speed of discharging steam at the time of starting to discharge steam to be described later. Further, steam in the second half of the heating step is raised in pressure to increase the temperature of steam. Thus, even where the mold temperature becomes closer to the temperature of steam and the molds are decreased in temperature elevating speed, it is possible to obtain a greater temperature elevating speed than the case when the discharge piping on-off valve 48 is opened. In order to maximize the temperature elevating speed, the variable throttle valve 49 may be adjusted and narrowed down to such an extent that no steam flows.

It is preferable that the timer T18 presets the time which is estimated to minimize the time necessary for reaching a target mold heating temperature by using a temperature elevating curve when the discharge piping on-off valve 48 is opened and a temperature elevating curve when the discharge piping on-off valve 48 is closed. Where the target mold heating temperature is sufficiently lower than a temperature of steam supplied from the boiler 17, the timer T18 is disregarded. While the steam supplying on-off valve 36 is opened, the discharge piping on-off valve 48 is kept closed to adjust the pressure of steam inside the molds by the variable throttle valve 49, thus making it possible to obtain a mold temperature as a heating target in heating time substantially equal to the time during which the discharge piping on-off valve 48 is opened or closed. It is thus possible to save time and effort in evaluating a preset value of the timer T18.

It is preferable that a timer T19 shown in the diagrammatic drawing of FIG. 8 presets timing of opening the on-off valve 47 located between the discharge piping continuing from the molds and the cooling water discharge piping 24B continuing to the cooling equipment 18 such as a cooling tower. Upon completion of the time preset by the timer T3 which starts simultaneously with the motion of closing the steam supplying on-off valve 36, the timer T19 is started, and the on-off valve 47 is opened upon completion of the time preset by the timer T19. It is preferable that the timer T19 presets the time which is anticipated to give such a temperature that a heating medium returning from the drain piping continuing from the molds to the valve control unit (mold temperature controller) 19 is gradually decreased in temperature by switching the heating medium from a heating-use medium to a cooling-use medium to cause no trouble, even if the medium is returned directly to the cooling equipment 18 such as a cooling tower without passing through the mixer 30. The motion of closing the on-off valve 47 is conducted upon completion of the time preset by a timer T20 which is started in connection with the motion of opening the on-off valve 47. It is acceptable that the motion of opening/closing the on-off valve 47 in the cooling step of the molds is conducted not by using the timers T19, T20 but conducted at the time point when the temperature of the heating medium is detected to be lower than a predetermined temperature by the passed heating medium sensor 43 installed on the drain piping continuing from the molds.

Second Embodiment

An explanation will be made of the second embodiment by referring to the drawings.

Figure 3:
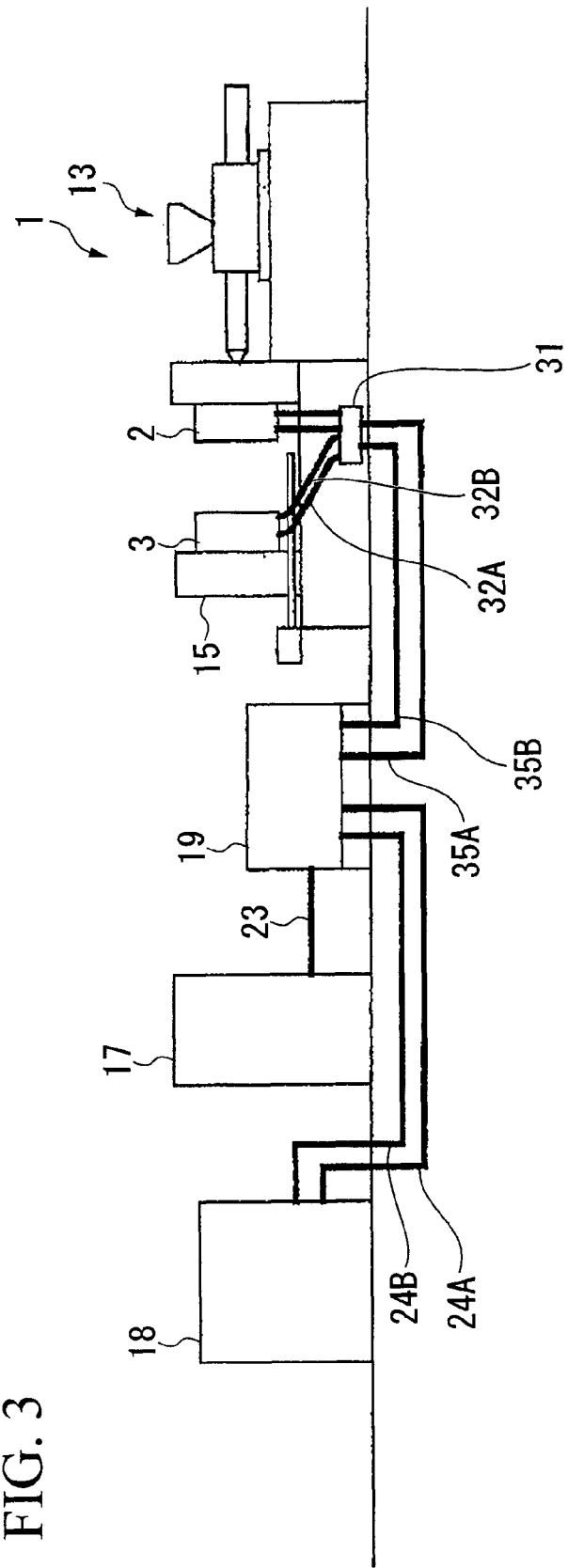
FIG. 3 is a lateral layout diagram showing the injection molding device of the second embodiment.
Figure 9:
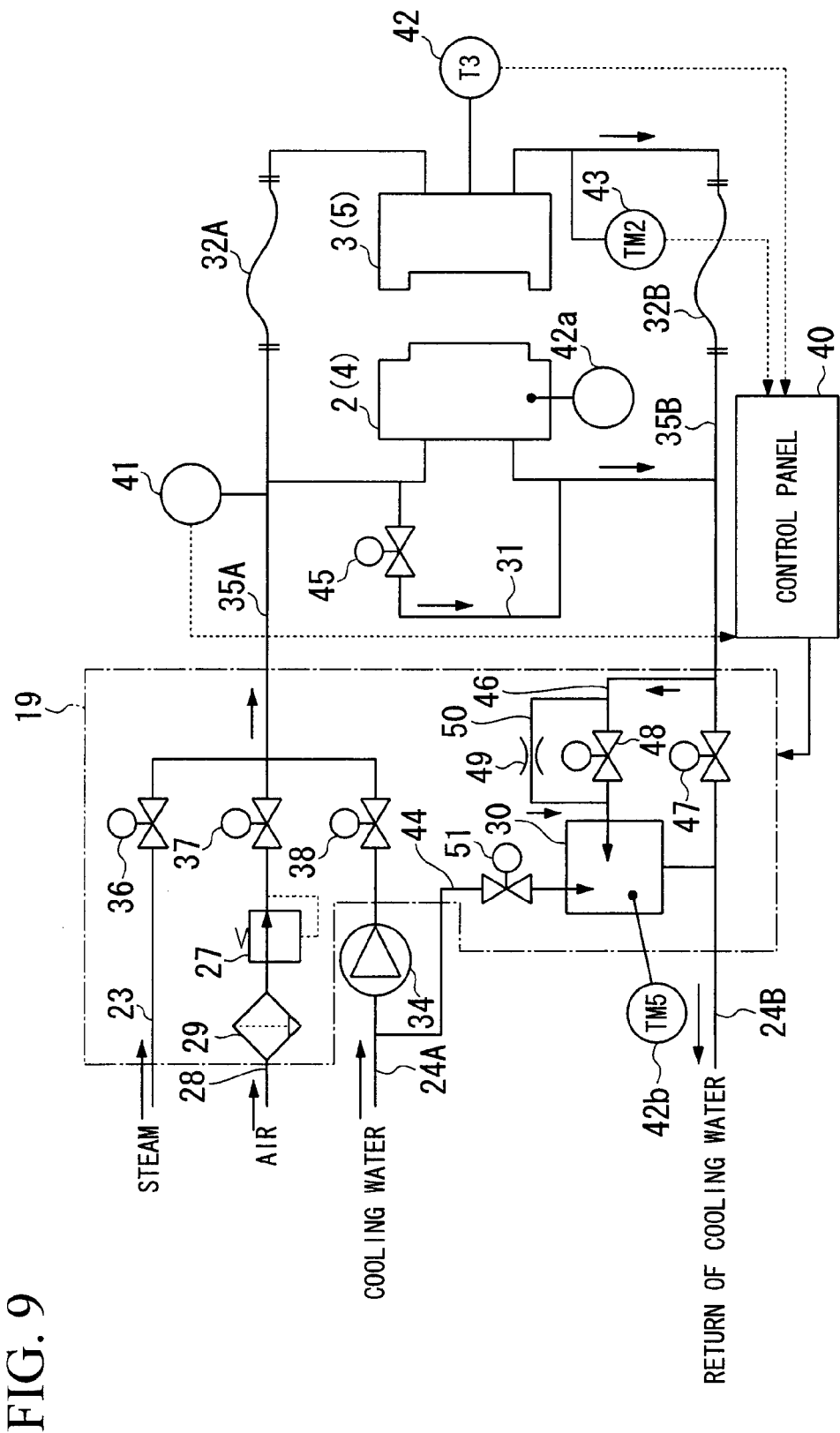
FIG. 9 is a pattern diagram of the mold heating circuit of the second embodiment.

FIG. 3 is a lateral layout diagram showing an injection molding device of the second embodiment. FIG. 9 is a pattern diagram of the mold heating circuit thereof. The injection molding device of the second embodiment is different from the injection molding device of the first embodiment in installation constitution of bypass piping.

In FIG. 3, which is a lateral layout diagram of the injection molding device, steam is fed from the boiler 17 to the valve controller unit (mold temperature controller) 19 through the steam supply piping 23. Cooling water is fed from the cooling equipment 18 such as a cooling tower to the valve controller unit (mold temperature controller) 19 by the cooling water supply piping 24A. Cooling water discharged from the molds is collected through the cooling water discharge piping 24B by the cooling equipment 18 such as a cooling tower. Steam, cooling water and scavenging compressed air from the valve controller unit (mold temperature controller) 19 to the nest 4 of the fixed mold 2 are supplied and discharged respectively by the supply piping 35A and the discharge piping 35B.

The mold bypass piping 31 and the mold bypass on-off valve 45 are installed at a position in the vicinity of one or both of the fixed mold 2 and the movable mold 3 and not far away therefrom. The mold bypass piping 31 is connected to an inlet piping 11a on the nest 4 of the fixed mold 2, and also coupled with an inlet piping 11b on the nest 5 of the movable mold 3 by the flexible piping 32A. The mold bypass piping 31 is connected to an outlet piping 12a on the nest 4 of the fixed mold 2, and also coupled with an outlet piping 12b on the nest 5 of the movable mold 3 by the flexible piping 32B. The flexible piping 32A and the flexible piping 32B correspond to movements on mold opening and closing the movable mold 3. Arrangement of the mold bypass piping 31 is advantageous where the movable mold 3 moves over a shorter distance on mold opening and also lower in cost. Further, this arrangement is easily applicable to an existing mold.

Third Embodiment

An explanation will be made of the third embodiment by referring to the drawings.

FIG. 10 is a diagrammatic drawing showing a mold temperature and opening/closing timing of each on-off valve corresponding to a molding step of an injection molding device having the mold heating circuit of FIG. 1. The injection molding device of the third embodiment is different from the injection molding device of the first embodiment in that while in the first embodiment, the heating step is completed at the time point when a mold temperature has reached a preset mold upper-limit temperature (TMS), in the third embodiment, the heating step is completed upon completion of the time preset by the timer T2 which starts from the beginning of supply of steam. It is also different in that while in the first embodiment, the cooling step is completed at the time point when the mold temperature has reached a cooling lower limit temperature (TMC), in the third embodiment, the cooling step is completed upon completion of the time preset by the timer T10 which starts from the beginning of supply of cooling water. Since other constitutions are all the same, explanations will be omitted for the same constitutions.

Figure 11:
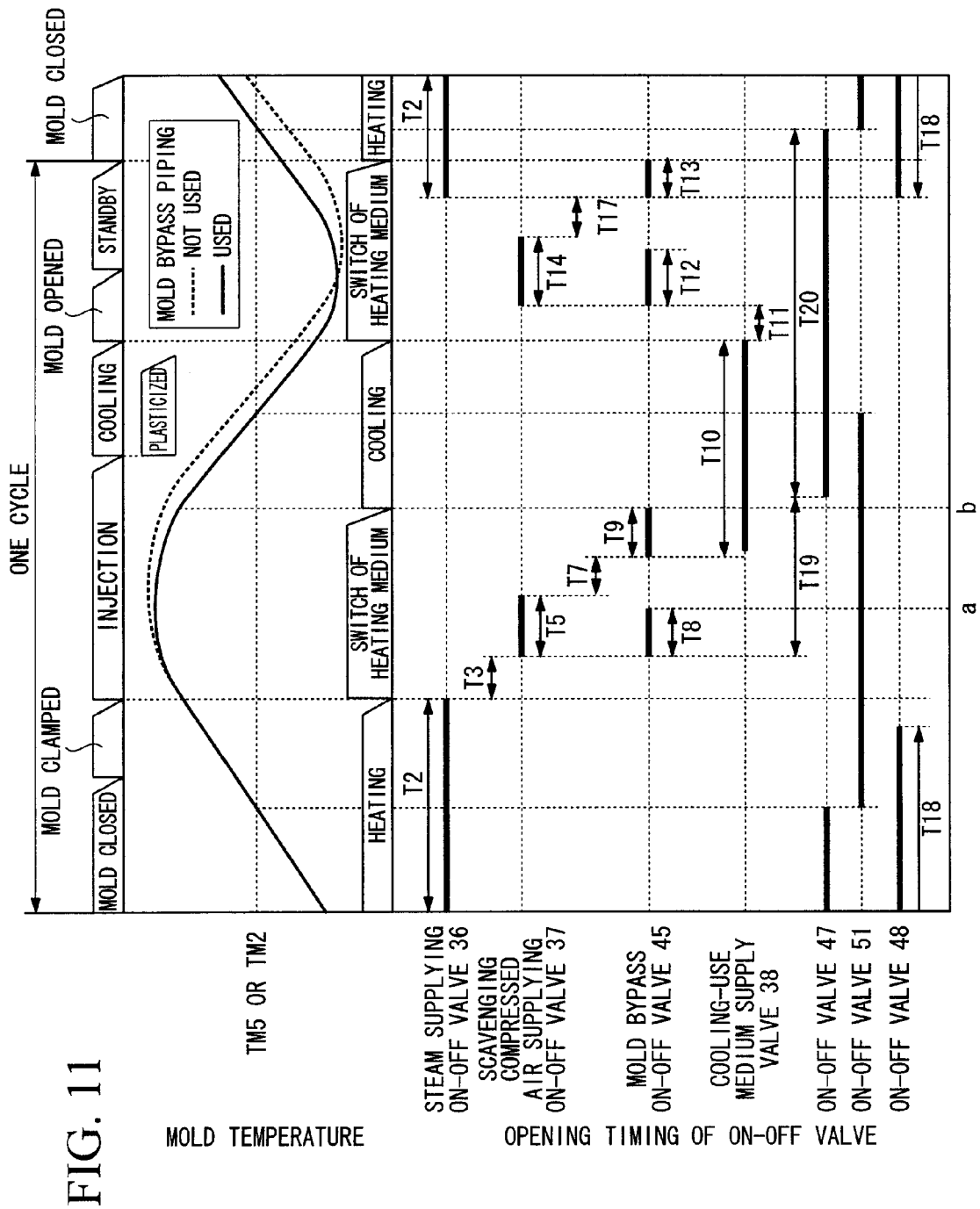
FIG. 11 is a diagrammatic drawing showing a mold temperature and opening timing of each on-off valve corresponding to the molding step of the third embodiment.

An explanation will be made of the mold temperature and opening timing of each on-off valve corresponding to the molding step of the injection molding device by referring to FIG. 1 and FIG. 11. The mold temperature control circuit is controlled by a method of repeating a heating step and a cooling step in the mold temperature control circuit, during which scavenging compressed air is supplied. In the heating step of the molds, the steam supplying on-off valve 36 of the steam supply piping 23 is opened to supply steam via the supply-side junction piping 25A into the fixed mold 2 and the movable mold 3, thereby starting to heat the nests 4, 5, and also starting the timer T2 for completing the heating. Upon completion of the time preset by the timer T2, the steam supplying on-off valve 36 is closed to complete the heating step of the molds.

At the time point of starting a cooling step of the molds after completion of the heating step of the molds, steam is discharged from the supply piping. Simultaneously with closing of the steam supplying on-off valve 36 in the previous step, the mold bypass on-off valves 45A, 45B are opened to make the mold bypass pipings 21A, 21B passable, the scavenging compressed air supplying on-off valve 37 is opened for a short time by presetting the timer T5, thereby steam inside the supply-side junction piping 25A is directly bypassed to the discharge-side junction piping 25B. Since steam is smaller in flow resistance, it can be discharged in a very short time.

After completion of the time preset by the timer T5, a time completion signal of the cooling start delay timer T7 is used to open the cooling water supplying on-off valve 38, thereby feeding cooling water to start cooling the molds, and also starting a timer T21 for completing the cooling. Upon completion of the time preset by the timer T21, the mold bypass on-off valves 45A, 45B are opened to make the mold bypass pipings 21A, 21B passable, and the cooling water supplying on-off valve 38 is closed to stop the supply of cooling water, thereby completing the cooling step of the molds. It is acceptable that the motion of closing the scavenging compressed air supplying on-off valve 37 is conducted not by the timer T5 but conducted at the time point a when the passed heating medium sensor 41 detects air.

The heating step or the cooling step is completed not by controlling the mold temperature, which is susceptible to variation, but by controlling completion of the time preset by a timer, thus making it possible to conduct molding at certain switching timing. Therefore, a stable molding cycle can be obtained, which is effective in stabilizing the quality of molded articles and enhancing productivity. In the present invention, the constitutions described in the above embodiments may be selected appropriately or changed to other constitutions whenever necessary within a scope not departing from the gist of the present invention.

INDUSTRIAL APPLICABILITY

According to the mold temperature control circuit of an injection molding device and the method for discharging a heating medium in the present invention, a heating medium remaining inside the heating medium supply piping between a supply source of the heating medium and the molds as well as inside the heating medium circuit within the molds is discharged in an accelerated manner to shorten the time necessary for switching the heating medium and cutting down the molding cycle. Thereby a mixture of a heating-use heating medium with a cooling-use heating medium discharged from the molds is reduced to enhance the energy efficiency of heat exchange and also simplify the structure of the mold temperature control circuit of an injection molding device.

DESCRIPTION OF THE SYMBOLS

1 . . . Injection molding device
2 . . . Fixed mold
3 . . . Movable mold
4, 5 . . . Nest
13 . . . Injection unit
17 . . . Boiler
18 . . . Cooling equipment
19 . . . Valve control unit (Mold temperature controller)
21, 31 . . . Mold bypass pipings
23 . . . Steam supply piping
24A . . . Cooling water supply piping
24B . . . Cooling water discharge piping
25A . . . Supply-side junction piping
25B . . . Discharge-side junction piping
30 . . . Mixer
36 . . . Steam supplying on-off valve
37 . . . Scavenging compressed air supplying on-off valve
38 . . . Cooling water supplying on-off valve
40 . . . Control panel
41, 43 . . . Passed heating medium sensor
42, 42a, 42b . . . Temperature sensor
45 . . . Mold bypass on-off valve
47, 51, 61 . . . On-off valve
48 . . . Discharge piping on-off valve
49 . . . Variable throttle valve
50 . . . Discharge piping bypass piping
T3, T5, T7, T8, T9, T10 . . . Timer
T11, T12, T14, T17, T18, T19, T20 . . . Timer

The invention claimed is:

1. A mold temperature control circuit of an injection molding device comprising:
a fixed mold and/or a movable mold;
a supply-side manifold connecting the molds with supply pipings of a heating-use medium, a cooling-use medium and scavenging compressed air;
a discharge-side manifold connecting the molds with discharge pipings of the heating-use medium, the cooling-use medium and the scavenging compressed air;
a plurality of heating/cooling common-use fine pipings which are housed inside the molds and joined to these manifolds; and
a mold temperature sensor installed on the molds; wherein
in an injection step of closing the molds to effect clamping and thereafter injecting a resin, such a molding cycle is repeated that, prior to injection of the resin, the heating-use medium is returned to the molds and heated to a temperature suitable for resin injection, after injection of the resin, the heating-use medium is switched to the cooling-use medium, thereby the cooling-use medium is returned to the molds to conduct cooling so as to give a temperature equal to or lower than a temperature at which the resin is solidified,
the mold temperature control circuit of the injection molding device which is provided with an on-off valve of the supply piping of the heating-use medium, an on-off valve of the supply piping of the cooling-use medium, an on-off valve of the supply piping of the scavenging compressed air for discharging the heating-use medium and the cooling-use medium from inside the pipings and the molds, and a junction piping of combining the respective supply pipings of the heating-use medium, the cooling-use medium and the scavenging compressed air into one, thereby the junction piping is able to use commonly the respective supply pipings of the heating-use medium, the cooling-use medium and the scavenging compressed air to the molds and the respective discharge pipings thereof, and
comprising:
mold bypass piping for coupling the supply-side junction piping of a heating medium with the discharge-side junction piping thereof;
a mold bypass on-off valve installed on the mold bypass piping;
a passed heating medium sensor for detecting passage of the heating-use medium, the cooling-use medium and the scavenging compressed air on the heating medium supply piping and/or the discharge piping or a timer of adjusting opening/closing timing of the mold bypass on-off valve; and
a mold-temperature adjusting control device which stores a mold temperature determination program for comparatively determining a target mold temperature preset as a control program and a mold temperature detected by the mold temperature sensor as well as a passed heating medium determination program for determining a type of passed heating medium by using completion of the time preset by a timer for adjusting opening/closing timing of the mold bypass on-off valve and/or a signal detected by the passed heating medium sensor, thereby adjusting the opening/closing timing of the mold bypass on-off valve.

2. The mold temperature control circuit of the injection molding device according to claim 1, wherein the mold bypass piping and the mold bypass on-off valve are installed on the fixed mold and/or the movable mold.

3. The mold temperature control circuit of the injection molding device according to claim 1, wherein a pair of mold bypass circuits including the mold bypass piping and the mold bypass on-off valve are coupled with supply ports and discharge ports of both the fixed mold and the movable mold in the vicinity of the fixed mold and/or the movable mold, and the fixed mold and the movable mold commonly use the mold bypass circuit.

4. The mold temperature control circuit of the injection molding device according to claim 1, wherein the passed heating medium sensor is a pressure sensor or a temperature sensor.

5. The mold temperature control circuit of the injection molding device according to claim 1, comprising:

a mixer for mixing the heating-use medium discharged from the molds with the cooling-use medium for cooling the heating-use medium;

a discharge piping on-off valve which is located in the vicinity of the mixer to open and close a flow path communicatively connecting the discharge pipings of the molds with the mixer;

discharge piping on-off valve bypass piping which circumvents the discharge piping on-off valve communicatively connecting with the mixer; and a variable throttle valve which is located on the discharge piping on-off valve bypass piping and capable of adjusting a flow rate of the heating-use medium.

6. A mold temperature control circuit of an injection molding device comprising:

a fixed mold and/or a movable mold;

a supply-side manifold for connecting the molds with supply pipings of a heating-use medium, a cooling-use medium and scavenging compressed air;

a discharge-side manifold for connecting the molds with discharge pipings of the heating-use medium, the cooling-use medium and the scavenging compressed air;

a plurality of heating/cooling common-use fine pipings which are housed inside the molds and joined to these manifolds; and a mold temperature sensor installed on the molds, wherein in an injection step of closing the molds to effect clamping and thereafter injecting a resin, such a molding cycle is repeated that, prior to injection of the resin, the heating-use medium is returned to the molds and heated to a temperature suitable for resin injection, after injection of the resin, the heating-use medium is switched to the cooling-use medium, thereby the cooling-use medium is returned to the molds to conduct cooling so as to give a temperature equal to or lower than a temperature at which the resin is solidified, and the mold temperature control circuit of the injection molding device has installed on the downstream side of discharge pipings of the molds:

a mixer for mixing the heating-use medium discharged from the molds with the cooling-use medium for cooling the heating-use medium;

a discharge piping on-off valve which is located in the vicinity of the mixer to open and close a flow path communicatively connecting the discharge pipings of the molds with the mixer;

discharge piping on-off valve bypass piping which circumvents the discharge piping on-off valve communicatively connecting with the mixer; and a variable throttle valve which is located on the discharge piping on-off valve bypass piping and capable of adjusting a flow rate of the heating-use medium.

7. A method for discharging a heating medium of an injection molding device including the mold temperature control circuit according to claim 1, simultaneously with a halt of supplying the heating medium in a previous step, a heating medium switching delay timer is started, completion of the time preset by the heating medium switching delay timer or a heating medium supply starting signal in a later step according to progress of an injection step is used to start to supply the heating medium in the later step, conduct a motion of opening the mold bypass circuit and start a mold bypass circuit closing delay timer, and upon completion of the time preset by the mold bypass circuit closing delay timer or at a time point when the passed heating medium sensor installed on the mold supply-side piping portion detects the heating medium in a next step, the mold bypass circuit is closed.

8. A method for discharging a heating medium of an injection molding device according to claim 7, wherein during a heating step, of a first half of heating, the discharge piping on-off valve installed on piping between the heating medium discharge piping continuing from the molds and the mixer is opened, of a second half of heating, the discharge piping on-off valve is closed, a variable throttle valve installed on the discharge piping on-off valve bypass piping which bypasses the drain piping on-off valve is used to adjust the flow rate and pressure of the heating-use medium, thereby the heating-use medium on completion of heating is made higher in pressure than the heating-use medium in the first half of heating.

9. A method for discharging a heating medium of an injection molding device according to claim 7, wherein while a heating medium which enters from the discharge piping of a heating medium continuing from the molds into the mixer is high in temperature, the discharge piping on-off valve installed on piping between the discharge piping and the mixer is opened and also the heating medium discharge valve which connects the discharge piping continuing from the molds with return piping to external cooling equipment is closed to introduce the heating medium into the mixer, and while the heating medium which enters from the discharge piping into the mixer is not high in temperature, the heating medium discharge valve which connects the discharge piping continuing from the molds with the return piping to the external cooling equipment is opened, thereby the heating medium discharged from the molds through the discharge piping is discharged to the external cooling equipment.

10. A method for discharging a heating medium of an injection molding device including the mold temperature control circuit according to claim 1, simultaneously with a halt of supplying a heating-use medium, a heating medium switching delay timer is started, completion of the time preset by the heating medium switching delay timer or a heating medium switch starting signal according to progress of an injection step is used to start the supply of scavenging compressed air, conduct a motion of opening the mold bypass circuit and start a mold bypass circuit closing delay timer, upon completion of the time preset by the mold bypass circuit closing delay timer or at a time point when the passed heating medium sensor installed on the mold supply-side piping portion detects scavenging compressed air, the mold bypass circuit is closed, a scavenging compressed air supply halt delay timer is started at the same time, and upon completion of the time preset by the scavenging compressed air supply halt delay timer or at a time point when a passed heating medium sensor installed on the mold discharge-side piping portion detects scavenging compressed air, the supply of scavenging compressed air is halted.

11. A method for discharging a heating medium of an injection molding device according to claim 10, wherein
during a heating step, of a first half of heating, the discharge piping on-off valve installed on piping between the heating medium discharge piping continuing from the molds and the mixer is opened, of a second half of heating, the discharge piping on-off valve is closed, a variable throttle valve installed on the discharge piping on-off valve bypass piping which bypasses the drain piping on-off valve is used to adjust the flow rate and pressure of the heating-use medium, thereby the heating-use medium on completion of heating is made higher in pressure than the heating-use medium in the first half of heating.

12. A method for discharging a heating medium of an injection molding device according to claim 10, wherein
while a heating medium which enters from the discharge piping of a heating medium continuing from the molds into the mixer is high in temperature, the discharge piping on-off valve installed on piping between the discharge piping and the mixer is opened and also the heating medium discharge valve which connects the discharge piping continuing from the molds with return piping to external cooling equipment is closed to introduce the heating medium into the mixer, and while the heating medium which enters from the discharge piping into the mixer is not high in temperature, the heating medium discharge valve which connects the discharge piping continuing from the molds with the return piping to the external cooling equipment is opened, thereby the heating medium discharged from the molds through the discharge piping is discharged to the external cooling equipment.

13. A method for discharging a heating medium of an injection molding device including the mold temperature control circuit according to claim 1, simultaneously with a halt of supplying a heating-use medium, a heating medium switching delay timer is started, completion of the time preset by the heating medium switching delay timer or a heating medium switch starting signal according to progress of an injection step is used to start the supply of scavenging compressed air, conduct a motion of opening the mold bypass circuit and start a scavenging compressed air supply halt delay timer, upon completion of the time preset by the scavenging compressed air supply halt delay timer or at a time point when the passed heating medium sensor installed on the mold supply-side piping portion detects scavenging compressed air, the supply of scavenging compressed air is halted to start a cooling motion start delay timer, completion of the time preset by the cooling motion start delay timer or a cooling start signal according to progress of the injection step is used to start the supply of a cooling-use medium and also start the mold bypass circuit closing delay timer, and upon completion of the time preset by the mold bypass circuit closing delay timer or at a time point when the passed heating medium sensor installed on the mold supply-side piping portion detects the cooling-use medium, the mold bypass circuit is closed.

14. A method for discharging a heating medium of an injection molding device according to claim 13, wherein
during a heating step, of a first half of heating, the discharge piping on-off valve installed on piping between the heating medium discharge piping continuing from the molds and the mixer is opened, of a second half of heating, the discharge piping on-off valve is closed, a variable throttle valve installed on the discharge piping on-off valve bypass piping which bypasses the drain piping on-off valve is used to adjust the flow rate and pressure of the heating-use medium, thereby the heating-use medium on completion of heating is made higher in pressure than the heating-use medium in the first half of heating.

15. A method for discharging a heating medium of an injection molding device according to claim 13, wherein
while a heating medium which enters from the discharge piping of a heating medium continuing from the molds into the mixer is high in temperature, the discharge piping on-off valve installed on piping between the discharge piping and the mixer is opened and also the heating medium discharge valve which connects the discharge piping continuing from the molds with return piping to external cooling equipment is closed to introduce the heating medium into the mixer, and while the heating medium which enters from the discharge piping into the mixer is not high in temperature, the heating medium discharge valve which connects the discharge piping continuing from the molds with the return piping to the external cooling equipment is opened, thereby the heating medium discharged from the molds through the discharge piping is discharged to the external cooling equipment.

16. A method for discharging a heating medium of an injection molding device including the mold temperature control circuit according to claim 1, simultaneously with a halt of supplying a cooling-use medium, a heating medium switching delay timer is started, completion of the time preset by the heating medium switching delay timer or a heating medium switch starting signal according to progress of an injection step is used to start the supply of scavenging compressed air and conduct a motion of opening the mold bypass circuit, upon completion of the time preset by a predetermined timer or at a time point when the passed heating medium sensor installed on the mold supply-side piping portion detects scavenging compressed air, the mold bypass circuit is closed, and upon completion of the time preset by the predetermined timer or at a time point when the passed heating medium sensor installed on the mold discharge-side piping portion detects scavenging compressed air, the supply of scavenging compressed air is halted.

17. A method for discharging a heating medium of an injection molding device according to claim 16, wherein
during a heating step, of a first half of heating, the discharge piping on-off valve installed on piping between the heating medium discharge piping continuing from the molds and the mixer is opened, of a second half of heating, the discharge piping on-off valve is closed, a variable throttle valve installed on the discharge piping on-off valve bypass piping which bypasses the drain piping on-off valve is used to adjust the flow rate and pressure of the heating-use medium, thereby the heating-use medium on completion of heating is made higher in pressure than the heating-use medium in the first half of heating.

18. A method for discharging a heating medium of an injection molding device according to claim 16, wherein
while a heating medium which enters from the discharge piping of a heating medium continuing from the molds into the mixer is high in temperature, the discharge piping on-off valve installed on piping between the discharge piping and the mixer is opened and also the heating medium discharge valve which connects the discharge piping continuing from the molds with return piping to external cooling equipment is closed to introduce the heating medium into the mixer, and while the heating medium which enters from the discharge piping into the mixer is not high in temperature, the heating medium discharge valve which connects the discharge piping continuing from the molds with the return piping to the external cooling equipment is opened, thereby the heating medium discharged from the molds through the discharge piping is discharged to the external cooling equipment.

19. A method for discharging a heating medium of an injection molding device including the mold temperature control circuit according to claim 1,
simultaneously with completion of a cooling step, a heating medium switching delay timer is started, completion of the time preset by the heating medium switching delay timer or a heating medium switch starting signal according to progress of an injection step is used to start the supply of scavenging compressed air and conduct a motion of opening the mold bypass circuit, upon completion of the time preset by a predetermined timer or at a time point when the passed heating medium sensor installed on the mold supply-side piping portion detects scavenging compressed air, the supply of scavenging compressed air is halted and also a heating motion start/delay timer is started, completion of the time preset by the heating motion start/delay timer or a heating start signal according to progress of the injection step is used to start a heating motion, and upon completion of the time preset by the predetermined timer or at a time point when the passed heating medium sensor installed on a mold supply-side piping portion detects a heating-use medium, the mold bypass circuit is closed.

20. A method for discharging a heating medium of an injection molding device according to claim 19 wherein
during a heating step, of a first half of heating, the discharge piping on-off valve installed on piping between the heating medium discharge piping continuing from the molds and the mixer is opened, of a second half of heating, the discharge piping on-off valve is closed, a variable throttle valve installed on the discharge piping on-off valve bypass piping which bypasses the drain piping on-off valve is used to adjust the flow rate and pressure of the heating-use medium, thereby the heating-use medium on completion of heating is made higher in pressure than the heating-use medium in the first half of heating.

21. A method for discharging a heating medium of an injection molding device according to claim 19, wherein
while a heating medium which enters from the discharge piping of a heating medium continuing from the molds into the mixer is high in temperature, the discharge piping on-off valve installed on piping between the discharge piping and the mixer is opened and also the heating medium discharge valve which connects the discharge piping continuing from the molds with return piping to external cooling equipment is closed to introduce the heating medium into the mixer, and while the heating medium which enters from the discharge piping into the mixer is not high in temperature, the heating medium discharge valve which connects the discharge piping continuing from the molds with the return piping to the external cooling equipment is opened, thereby the heating medium discharged from the molds through the discharge piping is discharged to the external cooling equipment.

22. A method for discharging a heating medium of an injection molding device including the mold temperature control circuit according to claim 6, during a heating step, of a first half of heating, the discharge piping on-off valve installed on piping between the heating medium discharge piping continuing from the molds and the mixer is opened, of a second half of heating, the discharge piping on-off valve is closed, a variable throttle valve installed on the discharge piping on-off valve bypass piping which bypasses the drain piping on-off valve is used to adjust the flow rate and pressure of the heating-use medium, thereby the heating-use medium on completion of heating is made higher in pressure than the heating-use medium in the first half of heating.

23. A method for discharging a heating medium of an injection molding device including the mold temperature control circuit according to claim 6, while a heating medium which enters from the discharge piping of a heating medium continuing from the molds into the mixer is high in temperature, the discharge piping on-off valve installed on piping between the discharge piping and the mixer is opened and also the heating medium discharge valve which connects the discharge piping continuing from the molds with return piping to external cooling equipment is closed to introduce the heating medium into the mixer, and while the heating medium which enters from the discharge piping into the mixer is not high in temperature, the heating medium discharge valve which connects the discharge piping continuing from the molds with the return piping to the external cooling equipment is opened, thereby the heating medium discharged from the molds through the discharge piping is discharged to the external cooling equipment.

* * * * *